United States Patent
Ishibashi et al.

(10) Patent No.: US 10,599,509 B2
(45) Date of Patent: Mar. 24, 2020

(54) MANAGEMENT SYSTEM AND MANAGEMENT METHOD FOR COMPUTER SYSTEM

(71) Applicant: HITACHI, LTD., Tokyo (JP)

(72) Inventors: Yasuhiro Ishibashi, Tokyo (JP); Katsutoshi Asaki, Tokyo (JP); Yuri Hiraiwa, Tokyo (JP); Yuuki Miyamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 218 days.

(21) Appl. No.: 15/738,488

(22) PCT Filed: Dec. 21, 2015

(86) PCT No.: PCT/JP2015/085613
§ 371 (c)(1),
(2) Date: Dec. 20, 2017

(87) PCT Pub. No.: WO2017/109821
PCT Pub. Date: Jun. 29, 2017

(65) Prior Publication Data
US 2018/0181455 A1    Jun. 28, 2018

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0709* (2013.01); *G06F 11/0751* (2013.01);
(Continued)

(58) Field of Classification Search
CPC ............. G06F 11/0709; G06F 11/0751; G06F 11/0787; G06F 11/079; G06F 11/0793
See application file for complete search history.

(56) References Cited

U.S. PATENT DOCUMENTS

2005/0172162 A1 * 8/2005 Takahashi ........... G06F 11/0709
714/4.4
2005/0283638 A1 * 12/2005 Kato .................... G06F 11/0793
714/2
(Continued)

FOREIGN PATENT DOCUMENTS

WO    2014/073045 A1    5/2014
WO    2015/063889 A1    5/2015

OTHER PUBLICATIONS

Nagai et al. "Design of Fault Recovery Planning System for IT Systems", IEICE Technical Report, Mar. 7, 2013, vol. 112, No. 492, pp. 125-130.
(Continued)

Primary Examiner — Joshua P Lottich
(74) Attorney, Agent, or Firm — Volpe and Koenig, P.C.

(57) ABSTRACT

This management system for a computer system including a plurality of elements for which performance values are to be monitored generates one or more plans on the basis of: a performance value history of a specific bottleneck (an element that has been identified as the cause of a detected failure); management information that includes information indicating, for each countermeasure, the relation between a plurality of countermeasure attributes and a plurality of bottlenecks; and a countermeasure attribute corresponding to the specific bottleneck, and displays the one or more plans thus generated. Each of the displayed one or more plans includes one or more countermeasures. In each of the displayed one or more plans, each of the one or more countermeasures is classified into one of a plurality of countermeasure types.

15 Claims, 17 Drawing Sheets

(51) Int. Cl.
*G06F 11/34* (2006.01)
*G06F 11/30* (2006.01)

(52) U.S. Cl.
CPC ...... *G06F 11/0787* (2013.01); *G06F 11/0793* (2013.01); *G06F 11/30* (2013.01); *G06F 11/34* (2013.01)

(56) References Cited

U.S. PATENT DOCUMENTS

| | | | |
|---|---|---|---|
| 2014/0019795 A1* | 1/2014 | Sonoda | G06F 11/0751 714/2 |
| 2014/0068343 A1* | 3/2014 | Nakajima | G06F 11/3051 714/39 |
| 2015/0261462 A1 | 9/2015 | Miwa et al. | |
| 2015/0363249 A1* | 12/2015 | Mizobuchi | G06F 11/3452 714/47.3 |
| 2015/0370627 A1 | 12/2015 | Nakajima et al. | |

OTHER PUBLICATIONS

International Search Report dated Mar. 15, 2016 for the International Application No. PCT/JP2015/085613.

* cited by examiner

FIG. 4

Failure countermeasure information
145

| Countermeasure ID | B001 | | | | | | | | B002 | | ... |
|---|---|---|---|---|---|---|---|---|---|---|---|
| | Evaluation function | Start required time | Side effect ID | Extent of influence | Execution required time | The number of times of operation | Execution cost | | Evaluation function | | |
| M001 | f11(x, y) | g11(x) | S001 | E002 | 1h | once | $0 | | f12(x, y) | ... |
| M002 | f21(x, y) | g21(x) | S002 | E003 | 1h | twice | $1000 | | f22(x, y) | ... |
| ... | ... | ... | ... | ... | ... | ... | ... | | ... | ... |

Countermeasure type information
318

| Failure ID | Countermeasure ID | Countermeasure type name | Necessity of emergency countermeasure | Inclination after countermeasure |
|---|---|---|---|---|
| D001 | M001 | Fundamental treatment | Not required | -2 |
| D001 | M002 | Fundamental treatment | Required | -1 |
| D001 | M003 | Emergency treatment | N/A | 1 |
| . | . | . | . | . |

FIG. 6

Side effect information
317

| Side effect ID | Side effect outline | Side effect detail | Follow-up outline | Follow-up releasing trigger |
|---|---|---|---|---|
| S001 | Increase in MPB busy rate | h001(x, y) | Monitor cache write pending rate | Upon start of fundamental countermeasure |
| | | | Monitor busy rate | Upon completion of fundamental countermeasure |
| | Increase of IOPS | h002(x, y) | Monitor IO | Upon completion of fundamental countermeasure |
| S002 | Increase in MPB busy rate | h003(x, y) | N/A | N/A |
| . | . | . | . | . |

FIG. 7

Threshold information
316

| Bottleneck ID | First threshold | Second threshold |
|---|---|---|
| B001 | MPB busy rate 40% | MPB busy rate 80% |
| B002 | MPB busy rate 40% | MPB busy rate 80% |
| ⋮ | ⋮ | ⋮ |

Plan information
319

| Plan ID | Fundamental countermeasure ID | Emergency countermeasure ID | Follow-up countermeasure ID |
|---|---|---|---|
| P001 | M001 | M002 | M007<br>M008 |
| P002 | M001 | M003 | M007<br>M008<br>M009 |
| P003 | M009 | N/A | N/A |
| ⋮ | ⋮ | ⋮ | ⋮ |

801, 802, 803, 804

MANAGEMENT SYSTEM AND MANAGEMENT METHOD FOR COMPUTER SYSTEM

TECHNICAL FIELD

The present invention generally relates to management of a computer system.

BACKGROUND ART

Aggregation of IT infrastructures, rise of a cloud environment, and the like have made computer systems larger and more complicated. In such a computer system, it is difficult to determine countermeasures against a detected failure. In the case where an administrator of the computer system is a novice who has less knowledge or experience than an expert, it is particularly difficult to determine countermeasures.

For example, PTL 1 discloses the following technique, that is, a technique of identifying a virtual logical volume which is a cause of unsatisfaction of required performance, identifying consumption tendency of capacity of a pool, and generating and displaying countermeasures which can be implemented after predetermined time on the basis of the identified virtual logical volume and consumption tendency of the capacity.

CITATION LIST

Patent Literature

[PTL 1] WO 2014/073045

SUMMARY OF INVENTION

Technical Problem

While, according to PTL 1, countermeasures are displayed, all the countermeasures are the same type of countermeasures with which required performance is expected to be satisfied. It is not always easy for an administrator (particularly, a novice) to select a countermeasure among the countermeasures of the same type.

Solution to Problem

A management system of a computer system including a plurality of elements whose performance values are monitored generates one or more plans on the basis of history of a performance value of a specific bottleneck (an element identified as a cause of a detected failure), management information including information indicating relationship between a plurality of countermeasure attributes and a plurality of bottlenecks for each of a plurality of countermeasures, and a countermeasure attribute corresponding to the specific bottleneck, and displays the generated one or more plans. Each of the displayed one or more plans includes one or more countermeasures. In each of the displayed one or more plans, each of the one or more countermeasures is classified into one of a plurality of countermeasure types.

Advantageous Effects of Invention

In each of the displayed one or more plans, each of the one or more countermeasures is classified into one of a plurality of countermeasure types. There is also a case where at least one plan includes combination of two or more countermeasures. An administrator selects a plan from the displayed plans. In other words, the administrator selects a countermeasure in units of plan. Therefore, it is easy for the administrator to select a countermeasure.

BRIEF DESCRIPTION OF DRAWINGS

FIG. 4 illustrates a configuration of failure countermeasure information.
FIG. 5 illustrates a configuration of countermeasure type information.
FIG. 6 illustrates a configuration of side effect information.
FIG. 7 illustrates a configuration of threshold information.
FIG. 8 illustrates a configuration of plan information.

DESCRIPTION OF EMBODIMENT

Figure 1:
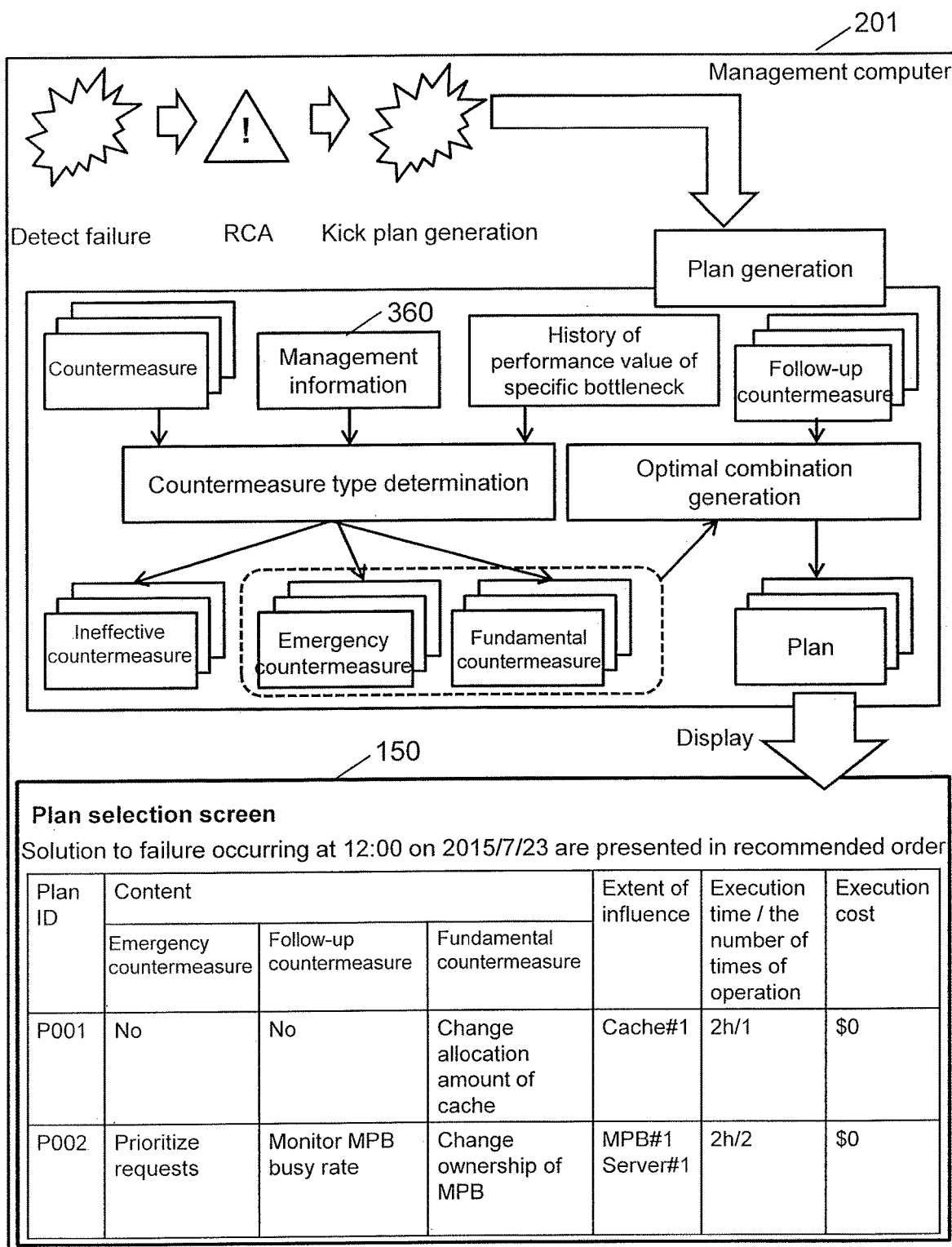
FIG. 1 illustrates outline of an embodiment.

An embodiment will be described below.

Note that, while, in the following description, there is a case where processing is described using a "program" as a subject, because the program performs predetermined processing using storage resources (for example, a memory) and/or a communication interface device (for example, a communication port), or the like, as appropriate by being executed by a processor (for example, a CPU (Central Processing Unit)), the subject of the processing may be made the processor. The processing described using the program as a subject may be made processing performed by the processor or an apparatus having the processor. Further, the processor may include a hardware circuit which performs part or all of the processing. The program may be installed in each controller from a program source. The program source may be, for example, a program distributing computer or a computer readable storage medium. Further, in the following description, two or more programs may be implemented as one program, or one program may be implemented as two or more programs.

Further, in the following description, a management system may be configured with one or more computers. Specifically, for example, in the case where the computer displays information (specifically, in the case where the computer displays information at a display device of the computer or the computer transmits information for display to a remote computer for display), the computer is the management system.

Further, in the following description, an "element" means a component of the computer system, and, specifically, a generic term of each of a plurality of nodes (apparatuses) constituting the computer system and each of a plurality of components held by each node. A node includes a physical node (for example, a server apparatus) and a logical node (for example, program instance executed at the server apparatus). In a similar manner, a component includes a physical component (for example, a CPU) and a logical component (for example, a logical volume). In the following description, while number is used as identification information of the element, other types of identification information may be used in place of or in addition to number.

In recent years, a computer system becomes larger and more complicated because of, for example, at least one of the followings:

A scale of processing handled by the computer system becomes larger.

Like cloud service, a number of types of processing are executed by the computer system.

Types of nodes within the computer system increase.

Because as a result of internal configuration of a node becoming complicated, types of components constituting the node (for example, logical components and physical components) increase, it becomes further necessary to manage these components.

Because a virtualization technique (for example, virtualization of a server, virtualization of a network, virtualization of a storage and virtualization of a data center) becomes widespread, it becomes possible to divide or aggregate apparatuses.

Deployment and migration techniques are advancing.

Here, "becoming larger" indicates that the number of elements to be managed within the computer system such as nodes constituting the computer system and components of the nodes increases. Further, "becoming complicated" indicates at least one of relationship between elements becoming M:1, 1:N or M:N (M and N are each integers of 2 or more) by increase of types of elements to be managed, at least one of values of M and N becoming greater and relationship between elements changing from moment to moment.

In the case where a failure of the computer system is detected and a cause element (an element as a cause of the failure (for example, a root cause)) is identified through failure analysis such as RCA (Root Cause Analysis), the management computer can present effective countermeasures (possible countermeasures). However, it is difficult for an administrator (particularly, a novice) to select one countermeasure or two or more countermeasures to be combined from merely display of a list of effective countermeasures. Selection of a countermeasure is further difficult in the computer system which has become larger and complicated.

Therefore, as illustrated in FIG. 1, in the present embodiment, the management computer 201 (an example of the management system) holds management information 360 which includes information indicating relationship between a plurality of countermeasure attributes associated with a countermeasure and a plurality of bottlenecks for each of a plurality of countermeasures defined in advance. Each of the "plurality of bottlenecks" described here is an element which can be a cause (for example, a root cause) of a failure which can occur. The management computer 201 generates one or more plans on the basis of the management information 360, history of a performance value of a specific bottleneck which is a bottleneck identified as a cause of the detected failure, and a countermeasure attribute corresponding to the specific bottleneck among the plurality of countermeasure attributes of the plurality of countermeasures. The management computer 201 displays the generated one or more plans. Each of the displayed one or more plans includes one or more countermeasures.

In each of the displayed one or more plans, each of the one or more countermeasures is classified into one of a plurality of countermeasure types. There is also a case where at least one plan includes combination of two or more countermeasures. The administrator selects a desired plan from the displayed plans. In other words, the administrator selects a countermeasure in units of plan. In other words, while a countermeasure type is different depending on the specific bottleneck (the cause of the failure) even for the same countermeasure, the administrator does not have to determine a countermeasure type of each countermeasure in accordance with the specific bottleneck (the cause of the failure), determine whether any two or more countermeasures can be combined or determine compatibility of the combination of the two or more countermeasures. Therefore, it is easy for the administrator to select a countermeasure.

As illustrated in FIG. 1, in the case where a failure is detected, and a bottleneck of the failure is identified through RCA (an example of failure analysis), plan generation is kicked. The management computer 201 executes countermeasure type determination and optimal combination generation which will be described later on the basis of the management information 360 (for example, a countermeasure attribute corresponding to the specific bottleneck) and an amount of change of a performance value in accordance with the history of the performance value of the specific bottleneck for each of the plurality of countermeasures. By this means, each countermeasure is classified into one of the plurality of countermeasure types. The management computer 201 generates one or more plans on the basis of the classification result.

The plurality of countermeasure attributes respectively associated with the plurality of countermeasures include (x1) change of a performance value which is expected for the countermeasure, and (x2) at least one of start required time which is time required until the countermeasure is started and execution required time which is time from when the countermeasure is started until when the countermeasure is finished. An example of (x1) is an evaluation function 403 which will be described later (see FIG. 4). An example of (x2) is start required time 404 and execution required time 407 which will be described later (see FIG. 4).

In the present embodiment, the plurality of countermeasure types include fundamental treatment and emergency treatment.

The "fundamental treatment" is a countermeasure for fundamentally solving a failure. Specifically, for example, the fundamental treatment is a countermeasure with which the performance value of the specific bottleneck is expected to be returned to equal to or smaller than a first threshold of the performance value until time limit.

The "emergency treatment" is a countermeasure for temporarily suppressing or preventing degradation of influence of a failure. Specifically, for example, the emergency treatment is a countermeasure with which an amount of change of the performance value of the specific bottleneck is expected to be reduced.

In the description of the present embodiment, in order to avoid mixture of the description, a countermeasure as a type will be referred to as "treatment", a countermeasure classified into the fundamental treatment will be referred to as a "fundamental countermeasure", and a countermeasure classified into the emergency treatment will be referred to as an "emergency countermeasure".

Further, in the present embodiment, the plurality of countermeasure types further include follow-up treatment. The "follow-up treatment" is a countermeasure as follow-up. The "follow-up" is an example of process monitoring, and is a countermeasure of monitoring whether a condition of any element (resource) gets worse or whether a new failure occurs while the countermeasure is being implemented. A secondary effect of the performance value is associated with at least one countermeasure as one of the countermeasure attributes, and a follow-up countermeasure (a countermeasure classified into the follow-up treatment) is associated with at least one secondary effect. In the present embodiment, for convenience sake, the secondary effect will be referred to as a "side effect".

An example of display of the generated one or more plans is a plan selection screen 150 illustrated in FIG. 1. According to the plan selection screen 150, the generated one or more plans are arranged in descending order of priority. Each of the one or more plans includes one or more countermeasures, and the one or more countermeasures is at least a fundamental countermeasure among the emergency countermeasure, the follow-up countermeasure and the fundamental countermeasure. Further, each of the one or more plans includes an extent of influence of a plan, required time and execution cost. The priority of each of the one or more plans is calculated by the management computer 201 on the basis of at least one of the number of countermeasures included in the plan, the extent (for example, the number of elements) of influence of the plan, the required time for the plan and the execution cost of the plan.

While terms such as the "emergency treatment" and the "side effect" are typically used in a medical field, general idea in the medical field cannot be applied in management of the computer system, and, if such application is possible, the management computer 201 according to the present embodiment cannot be constituted. An example of the reasons is as follows. In other words, in the computer system, a corresponding countermeasure type is not fixed for at least one countermeasure among the plurality of countermeasures, and is different according to conditions (for example, at least one of which element is the specific bottleneck, an amount of change of the future performance value in accordance with history of the performance value of the specific bottleneck, an effect expected as a result of execution of the countermeasure (for example, an amount of change of the performance value of the specific bottleneck after the countermeasure is implemented), the start required time 404 of the countermeasure and the execution required time 407 of the countermeasure). For example, even the same countermeasure may become an emergency countermeasure in one condition and may become a fundamental countermeasure in another condition. The management computer 201 classifies each of the plurality of countermeasures (except, for example, a follow-up countermeasure) into any countermeasure type while taking into account the condition when the plan is generated, and generates one or more plans on the basis of the classification result. In the generated plan, sometimes, only the fundamental countermeasure exists, and sometimes, combination of two or more countermeasures, specifically, combination of the fundamental countermeasure and the follow-up countermeasure or combination of the fundamental countermeasure, the emergency countermeasure and the follow-up countermeasure exists. Meanwhile, in the medical field, typically the type of the countermeasure is fixed (for example, hemostasis which is typically emergency treatment, does not become fundamental treatment).

Details of the present embodiment will be described below.

Figure 2:
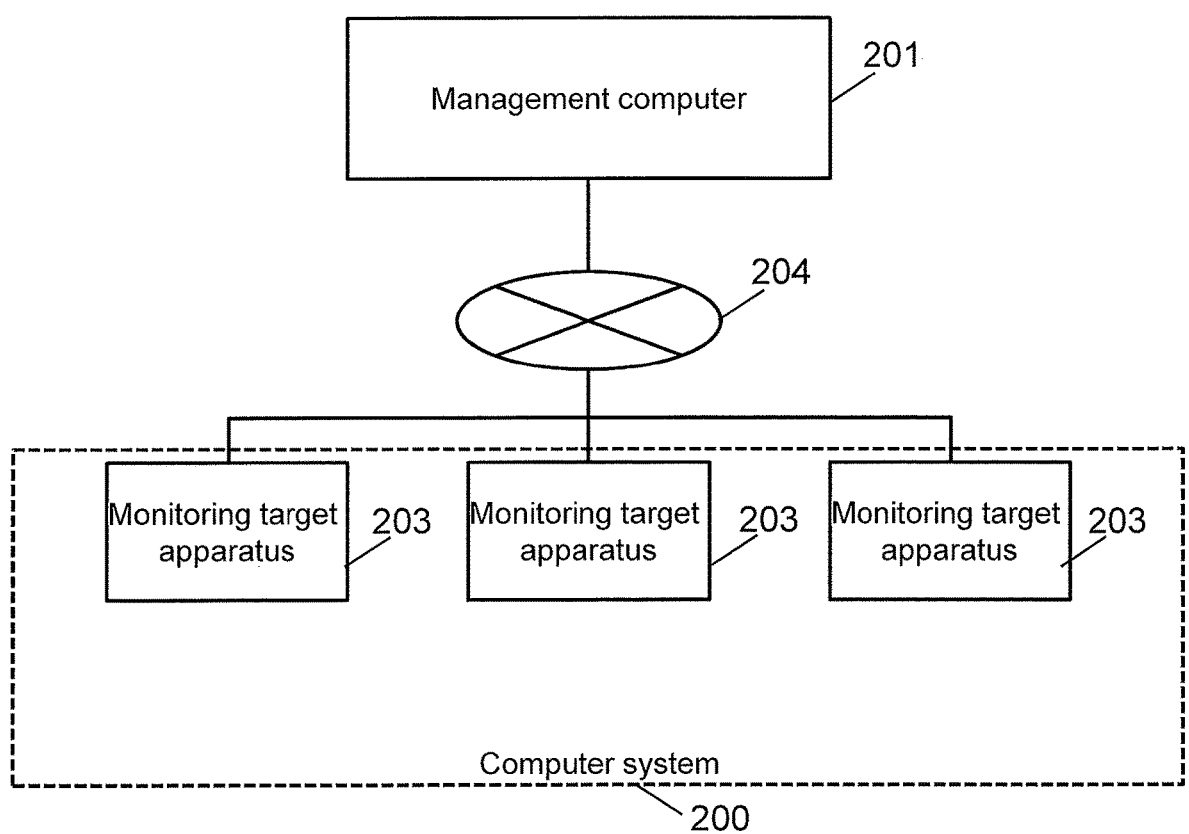
FIG. 2 illustrates a configuration of the whole system according to the embodiment.

FIG. 2 illustrates a configuration of the whole system according to the embodiment.

The management computer 201 is coupled to the computer system 200 via a communication network (for example, a LAN (Local Area Network) or a WAN (Wide Area Network)) 204.

The computer system 200 includes a plurality of monitoring target apparatuses 203. The monitoring target apparatus 203 is an example of the node. The monitoring target apparatus 203 has a plurality of components (computer resources). The plurality of components include, for example, a port, a network interface having a port, a MPB (Main Processor Board) (an example of a processor) and a memory.

Figure 3:
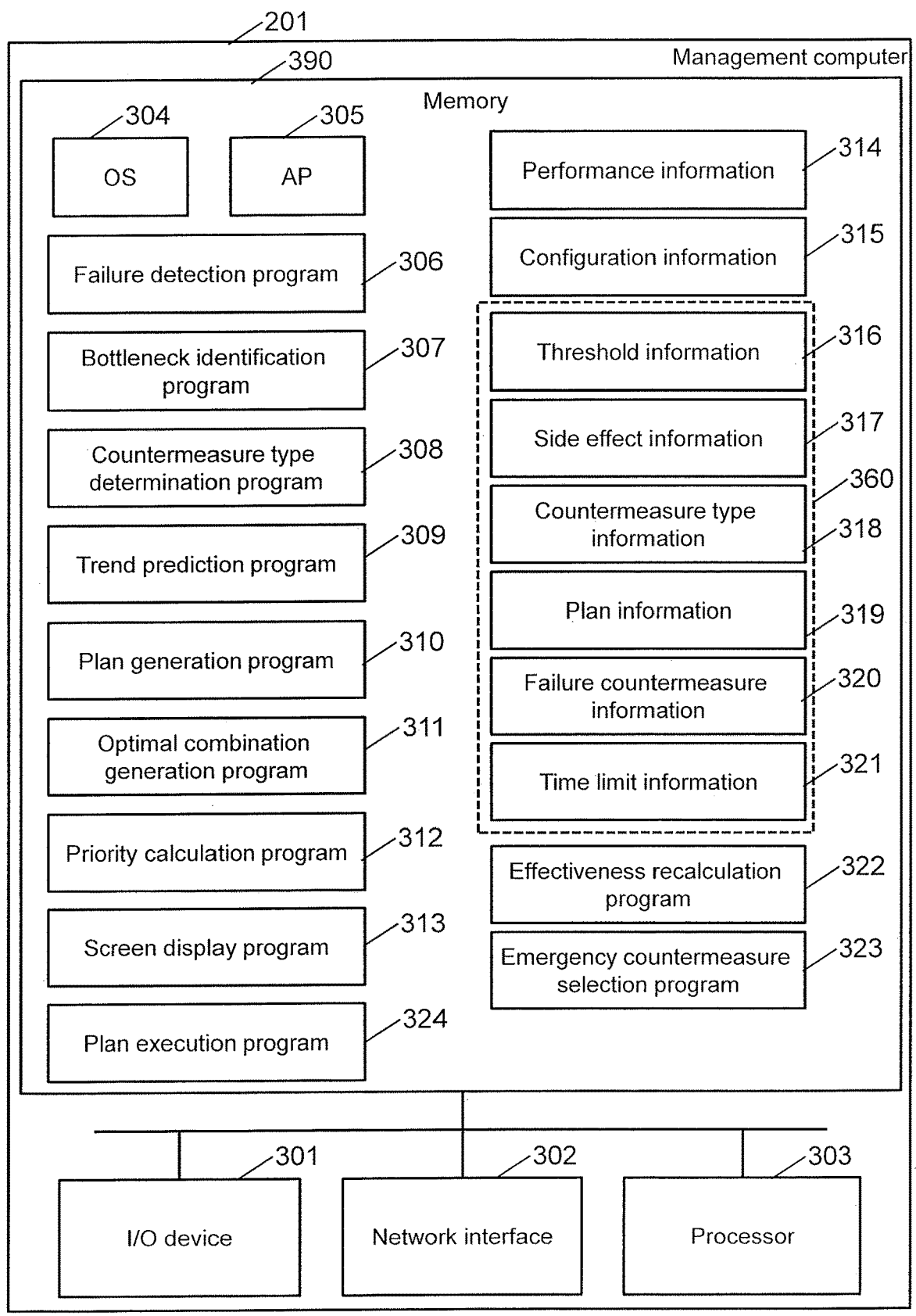
FIG. 3 illustrates a configuration of a management computer.

FIG. 3 illustrates a configuration of the management computer 201.

The management computer 201 has a network interface 302, an I/O (Input/Output) device 301, a memory 390 and a processor 303 coupled to these.

The network interface 302 is coupled to the communication network 204. The I/O device 301 is a user interface device such as an input device (for example, a keyboard and a pointing device) and an output device (for example, a display device).

The memory 390 includes a computer program executed by the processor 303 and information referred to or updated by the processor 303.

Examples of the computer program include, for example, an OS (Operating system) 304, an AP (Application Program) 305, a failure detection program 306, a bottleneck identification program 307, a countermeasure type determination program 308, a trend prediction program 309, a plan generation program 310, an optimal combination generation program 311, a priority calculation program 312, a screen display program 313, an emergency countermeasure selection program 323, an effectiveness recalculation program 322 and a plan execution program 324. The failure detection program 306 regularly acquires performance data of an element (for example, the monitoring target apparatus 203 and its component) of the computer system 200 and stores the acquired performance data in performance information and detects a failure from the acquired performance data. The performance data for the element may include, for example, a performance value (measurement value) and a measurement time point. The bottleneck identification program 307 identifies an element as a cause of the detected failure on the basis of, for example, performance information and configuration information (for example, displays candidate elements of a root cause as a result of RCA and receives selection of an element as the root cause from the administrator (user)). The countermeasure type determination program 308 determines a countermeasure type of each of a plurality of countermeasures (for example, countermeasures other than the follow-up countermeasure) on the basis of the specific bottleneck (an element identified as a cause of a failure) and the management information 360. The trend prediction program 309 predicts trend (specifically, a future performance value of the specific bottleneck) on the basis of the history of the performance value of the specific bottleneck. The plan generation program 310 generates one or more plans each including one or more countermeasures. The optimal combination generation program 311 generates combination of the fundamental countermeasure and the emergency countermeasure. The priority calculation program 312 calculates priority of the generated plan. The screen display program 313 displays one or more plans arranged according to the priority. The emergency countermeasure selection program 323 selects the emergency countermeasure to be combined with the fundamental countermeasure. The effectiveness recalculation program 322 recalculates effectiveness of the plan selected by the administrator from the displayed one or more plans. The plan execution program 324 executes the plan selected by the administrator. Among these programs, at least one of the failure detection program 306 and the bottleneck identification program 307 may be executed by a computer other than the management computer 201. In other words, a computer other than the management computer 201 may collect performance data (update the performance information 314), detect a failure and identify a bottleneck.

Examples of the information to be referred to or updated by the processor 303 include performance information 314, configuration information 315 and management information 360. The performance information 314 includes performance data acquired for each of the plurality of elements (monitoring target elements). In other words, in the performance information 314, performance data (including a performance value) for each of the plurality of elements is accumulated. The configuration information 315 indicates a configuration (for example, a topology configuration of a plurality of elements) of the computer system 200. The management information 360 includes information necessary for management of the computer system 200 other than the performance information 314 and the configuration information 315. Specifically, for example, the management information 360 includes threshold information 316, side effect information 317, countermeasure type information 318, plan information 319, failure countermeasure information 320 and time limit information 321. The threshold information 316 indicates a threshold of the performance value. The side effect information 317 indicates a side effect associated with the countermeasure. The countermeasure type information 318 indicates a classification result of the countermeasure. The plan information 319 indicates the generated one or more plans. The failure countermeasure information 320 is an example of information indicating relationship between a plurality of countermeasure attributes associated with the countermeasure and a plurality of bottlenecks for each of the plurality of countermeasures. The time limit information 321 indicates acceptable time until the performance value of the specific bottleneck is recovered (for example, the performance value becomes equal to or smaller than a first threshold), that is time limit.

FIG. 4 illustrates a configuration of the failure countermeasure information 320.

The failure countermeasure information 320 is, for example, a table, and has a record for each of the plurality of countermeasures (for examples, countermeasures other than the follow-up countermeasure). A countermeasure ID 401 and a countermeasure attribute set 450 are stored in each record. In each record, the countermeasure attribute set 450 exists for each of a plurality of bottleneck IDs 402. The countermeasure ID 401 is an ID of the countermeasure. The bottleneck ID 402 (for example, "B001") is an ID of the bottleneck (element).

The countermeasure attribute set 450 is a plurality of countermeasure attributes associated with the countermeasure. Examples of the countermeasure attribute includes, for example, an evaluation function 403, start required time 404, a side effect ID 405, an extent of influence 406, execution required time 407, the number of times of operation 408 and execution cost 409. The evaluation function 403 is an example of change of the performance value expected for the countermeasure, and is a function for deriving an amount of change of the performance value expected after the countermeasure is implemented. The start required time 404 is time required for starting the countermeasure, and, specifically, a function or a constant indicating such time. The side effect ID 405 is an ID of the side effect. The extent of influence 406 is an extent affected by the countermeasure, and, for example, the extent is expressed with an ID (for example, E002) of the element affected by the countermeasure. The execution required time 407 is time from when the countermeasure is started until when the countermeasure is finished. The number of times of operation 408 is the required number of times of operation performed in execution of the countermeasure. The execution cost 409 is cost required for executing the countermeasure.

FIG. 5 illustrates a configuration of the countermeasure type information 318.

The countermeasure type information 318 is, for example, a table, and has a record for each of the plurality of effective countermeasures. The "effective countermeasure" is a countermeasure classified into a countermeasure type other than ineffective treatment as a result of classification of countermeasures. In each record, a failure ID 501, a countermeasure ID 502, countermeasure type name 503, necessity of emergency countermeasure 504 and inclination after countermeasure 505 are stored. The failure ID 501 is an ID of the detected failure. The countermeasure ID 502 is an ID of an effective countermeasure for the failure. The countermeasure type name 503 indicates name of a countermeasure type (emergency treatment or fundamental treatment) of the effective countermeasure. The necessity of emergency countermeasure 504 is effective for the fundamental countermeasure and indicates whether or not combination with the emergency countermeasure is required. The inclination after countermeasure 505 is an example of an amount of change after the countermeasure is implemented, and indicates inclination of the performance value expected by the countermeasure (specifically, inclination calculated on the basis of the evaluation function 403 corresponding to the countermeasure and the specific bottleneck and inclination of a linear function of the performance value).

FIG. 6 illustrates a configuration of the side effect information 317.

The side effect information 317 is, for example, a table and has a record for each of a plurality of side effects. In each record, a side effect ID 601, side effect outline 602, side effect detail 603, follow-up outline 604 and a follow-up releasing trigger 605 are stored. The side effect ID 601 is an ID of the side effect. The side effect outline 602 indicates outline of the side effect. The side effect detail 603 indicates detail of the side effect, and, for example, indicates a function for deriving a maximum width of degradation of the performance value. The follow-up outline 604 indicates outline of follow-up for the side effect. The follow-up releasing trigger 605 indicates a trigger for finishing the follow-up.

FIG. 7 illustrates a configuration of the threshold information 316.

The threshold information 316 is, for example, a table, and has a record for each of the plurality of bottlenecks. In each record, a bottleneck ID 701, a first threshold 702 and a second threshold 703 are stored. The first threshold 702 is one of thresholds for the performance value of the bottleneck. The second threshold 703 is a threshold meaning that the performance value is worse than the first threshold. In the case where a lower performance value indicates better performance, the second threshold 703 is a value larger than the first threshold 702. On the other hand, in the case where a higher performance value indicates better performance, the second threshold 703 is a value smaller than the first threshold 702. The number of thresholds may be one, or three or more for the same bottleneck. Further, at least one performance value may be fixed or may be able to be changed by the administrator.

FIG. 8 illustrates a configuration of the plan information 319.

The plan information 319 is, for example, a table, and has a record for each of one or more plans. In each record, a plan ID 801, a fundamental countermeasure ID 802, an emergency countermeasure ID 803 and a follow-up countermeasure ID 804 are stored. The plan ID 801 is an ID of the plan. The fundamental countermeasure ID 802 is a countermeasure ID of the fundamental countermeasure. The emergency countermeasure ID 803 is a countermeasure ID of the emergency countermeasure. The follow-up countermeasure ID 804 is a countermeasure ID of the follow-up countermeasure. In the case where there is no emergency countermeasure in the plan, the emergency countermeasure ID 803 corresponding to the plan is "N/A" (Not Applicable). In the case where there is no follow-up countermeasure in the plan, the follow-up countermeasure ID 804 corresponding to the plan is also "N/A".

Processing performed in the present embodiment will be described below.

Figure 9:
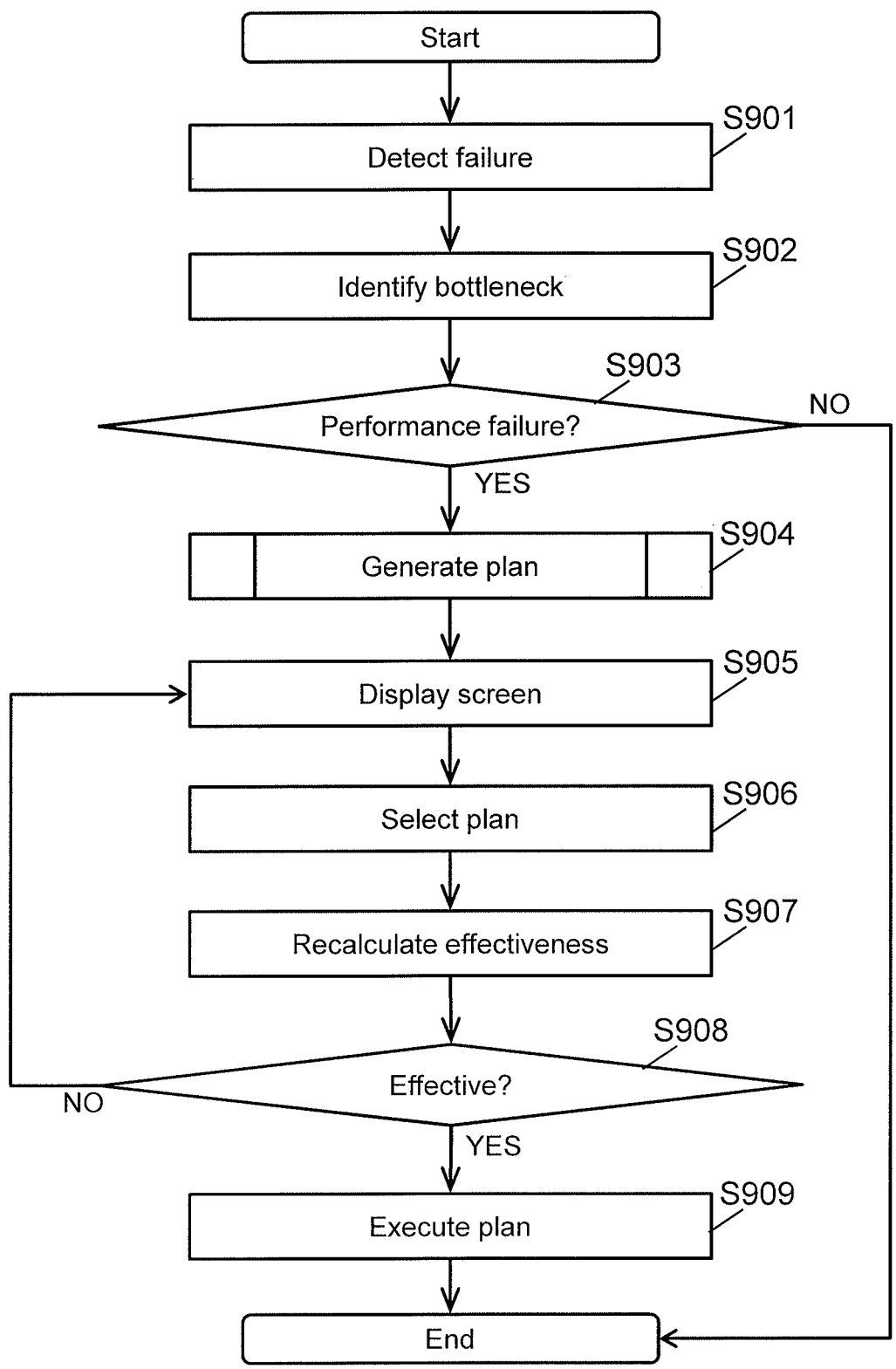
FIG. 9 illustrates flow of the whole processing performed in the embodiment.

FIG. 9 illustrates flow of the whole processing performed in the present embodiment.

The failure detection program 306 detects a failure which has occurred, on the basis of performance data from the computer system 200 (S901). The bottleneck identification program 307 identifies a bottleneck of the detected failure (S902). In the case where the detected failure is a performance failure (for example, the performance value exceeds at least the first threshold) (S903: Yes), the plan generation program 310 is kicked.

The plan generation program 310 executes plan generation (S904). The plan generation program 310 kicks the screen display program 313, and the screen display program 313 displays a plan selection screen 150 in accordance with the plan information 319 which is a result of the plan generation (S905). In the plan selection screen 150, as illustrated in FIG. 1, one or more plans are displayed.

The screen display program 313 kicks the effectiveness recalculation program 322 in the case where selection of a plan among the one or more plans displayed at the plan selection screen 150 is received from the administrator (S906). The effectiveness recalculation program 322 executes recalculation of effectiveness for the selected plan (S907). The meaning of recalculation of effectiveness is checking whether or not the plan selected by the administrator is effective when selection is received from the administrator because time has elapsed since a plan generation time point. "Recalculation" described here means performing processing similar to processing performed in plan generation (S904) for generating the selected plan, on the basis of a plan selection time point.

If the selected plan is not effective as a result of recalculation of effectiveness (S908: No), the effectiveness recalculation program 322 may notify the screen display program 313 that the selected plan is ineffective, and the screen display program 313 may display at the plan selection screen 150 that the selected plan is ineffective. Display of ineffectiveness of the selected plan may be performed by hiding the selected plan and leaving only the effective plan at the plan selection screen 150.

If the selected plan remains effective as a result of recalculation of effectiveness (S908: Yes), the effectiveness recalculation program 322 kicks the plan execution program 324. The plan execution program 324 executes the plan selected by the administrator (S909).

The outline of the whole processing performed in the present embodiment has been described above.

Plan generation (S904), screen display (S905) and recalculation of effectiveness (S907) will be described in detail below with reference to FIGS. 10 to 14. In the description, FIGS. 15 to 28 which visually illustrate the processing will be referred to as appropriate. Further, information (for example, functions and parameters) in an xy coordinate system indicated in FIGS. 15 to 28 exists in a memory 390. Further, in the xy coordinate system, an x coordinate is a time point, and a y coordinate is the performance value of the specific bottleneck (the bottleneck identified in S902).

Figure 10:
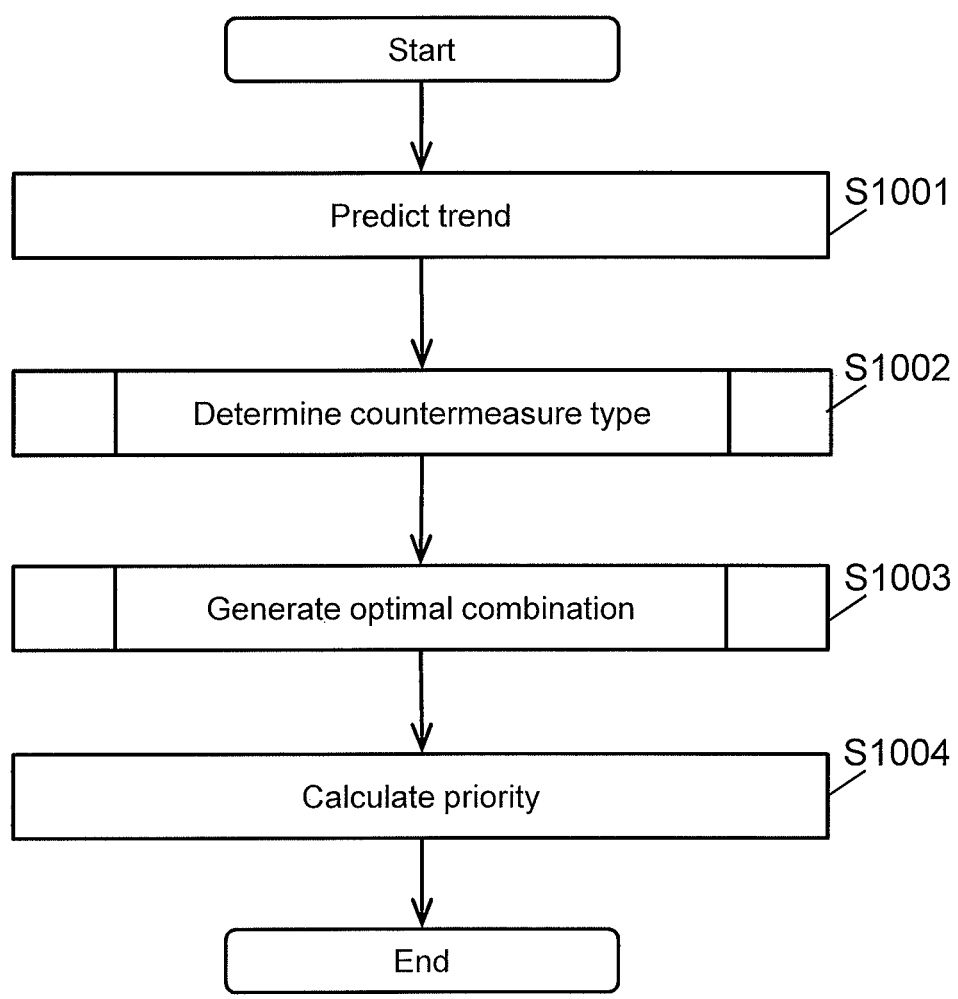
FIG. 10 illustrates flow of plan generation.

FIG. 10 illustrates flow of the plan generation (S904).

The plan generation program 310 kicks the trend prediction program 309. The trend prediction program 309 identifies history of the performance value (history of a pair of the performance value and the measurement time point) of the specific bottleneck from the performance information 314 and predicts trend 1501 (see FIG. 15) in accordance with the history of the performance value (S1001). In the present embodiment, the history of the performance value and the trend 1501 are linear functions of the performance value and, thus, an amount of change of the performance value is inclination of the linear function.

The plan generation program 310 kicks the countermeasure type determination program 308. The countermeasure type determination program 308 executes countermeasure type determination (S1002). The countermeasure type determination is determining a countermeasure type of each of the plurality of countermeasures (for example, countermeasures other than the follow-up countermeasure), that is, determining which of the countermeasure types each of the plurality of countermeasures corresponds to in the failure detected in S901.

The plan generation program 310 kicks the optimal combination generation program 311. The optimal combination generation program 311 executes optimal combination generation (S1003). The optimal combination generation includes determining whether or not the emergency countermeasure is necessary for the fundamental countermeasure, and selecting an optimal emergency countermeasure for the fundamental countermeasure in the case where the determination result is affirmative. In the present embodiment, combination of the fundamental countermeasure and the emergency countermeasure selected for the fundamental countermeasure will be referred to as "optimal combination". The predicted worst performance value of the specific bottleneck even if both side effects of the fundamental countermeasure and the emergency treatment in the optimal combination are taken into account is smaller than the second threshold.

The plan information 319 is completed through the optimal combination generation. The plan generation program 310 kicks the priority calculation program 312. The priority calculation program 312 calculates priority of each of one or more plans indicated by the plan information 319 (S1004). The priority calculation corresponds to preparation for displaying plans in descending order of the priority in screen display (S905). The priority is calculated on the basis of, for example, the following policy, that is, at least one of (p1) to (p5). (p2) to (p5) are values which can be identified from the failure countermeasure information 320. Note that arrangement of (p1) to (p5) means descending order of weighting. For example, in the case where the number of countermeasures of the first plan is smaller than that of the second plan, but an extent of influence of the first plan is larger than that of the second plan, because the first plan is superior to the second plan for the number of countermeasures with higher weighting, the priority of the first plan may be higher than that of the second plan. The order of weighting does not have to be limited to (p1) to (p5).

(p1) The number of countermeasures. The number of countermeasures is the number of countermeasures included in the plan. The priority of the plan is higher for a smaller number of countermeasures.

(p2) The extent of influence of the plan. The extent of influence of the plan is an extent of influence of execution of the plan (for example, the number of affected elements), and is, specifically, a sum of one or more extents of influence 406 (for example, the number of elements) corresponding to the one or more countermeasures in the plan. The priority of the plan is higher for a narrower extent of influence of the plan.

(p3) The plan required time. The plan required time is time required for executing the plan, and is, specifically, a sum of one or more pieces of execution required time 407 (and start required time 404) corresponding to the one or more countermeasures in the plan.

(p4) The number of times of plan operation. The number of times of plan operation is the number of times of operation performed in execution of the plan, and is, specifically, a sum of one or more numbers of times of operation 408 corresponding to the one or more countermeasures in the plan.

(p5) The plan execution cost. The plan execution cost is cost required for executing the plan, and is, specifically, a sum of one or more pieces of execution cost 409 corresponding to the one or more countermeasures in the plan.

Figure 11:
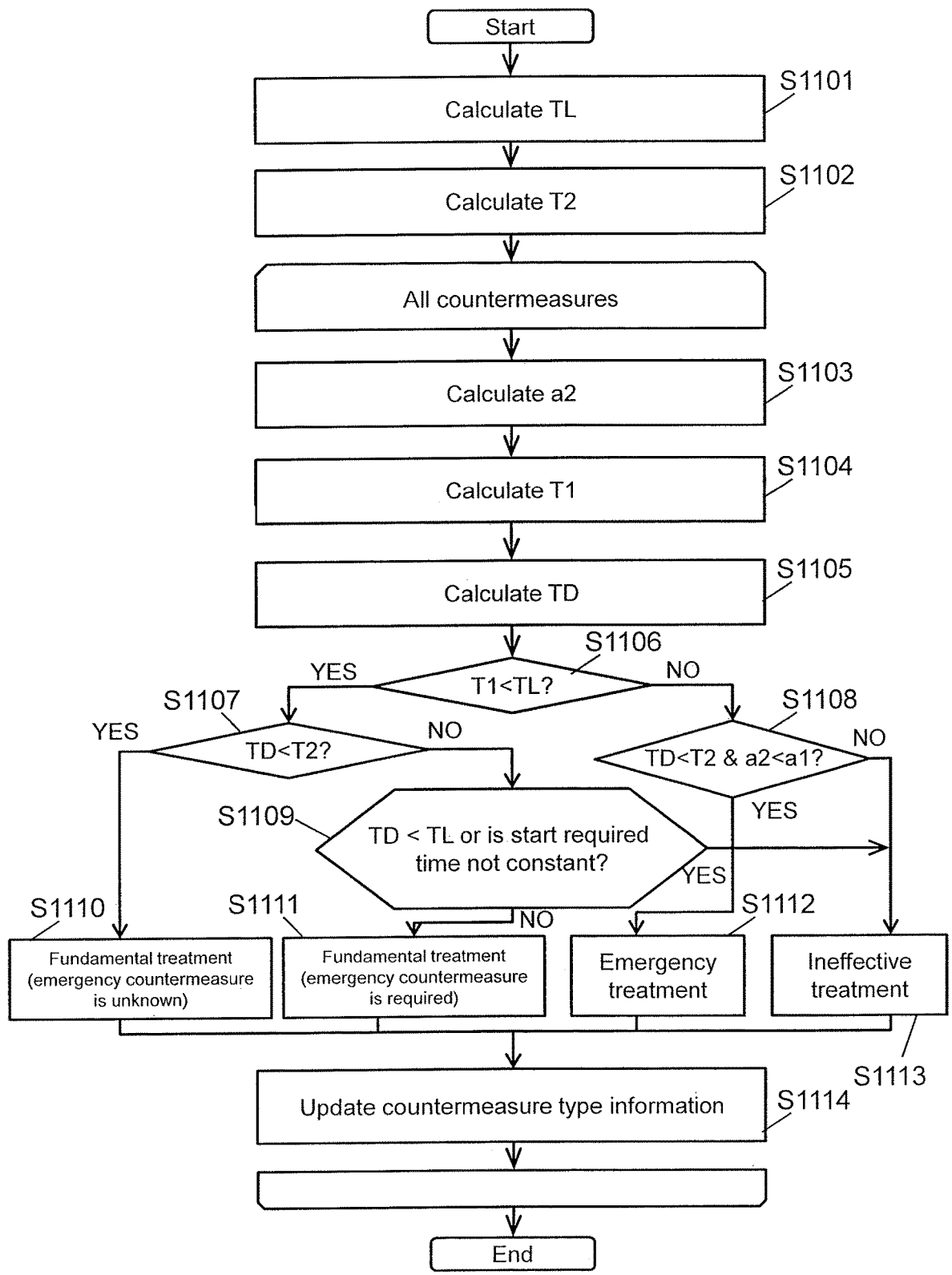
FIG. 11 illustrates flow of countermeasure type determination.
Figure 15:
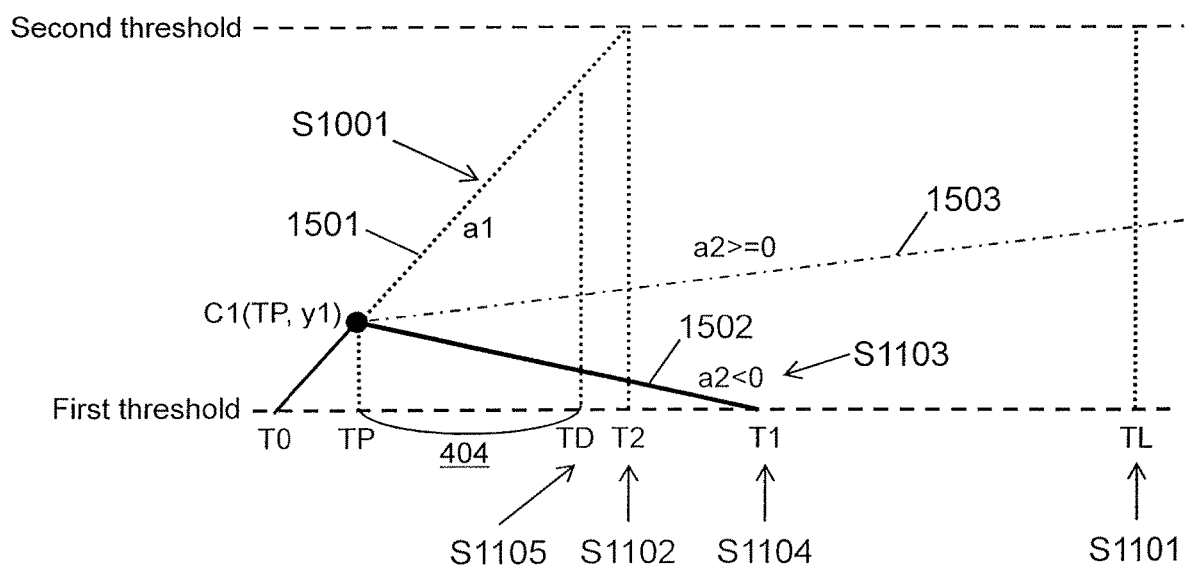
FIG. 15 is an auxiliary view of explanation of countermeasure type determination.

FIG. 11 illustrates flow of countermeasure type determination (S1002). Note that the first threshold and the second threshold described in the following description are the first threshold and the second threshold identified by the countermeasure type determination program 308 from the threshold information 316 using an ID of the specific bottleneck as a key. FIG. 15 will be referred to as appropriate in description of FIG. 11.

The countermeasure type determination program 308 calculates TL (S1101). TL is time limit, and is, specifically, a time point elapsed from TP by time limit (time indicated by the time limit information 321). TP is a plan generation time point, and is, specifically, for example, a time point at which plan generation (S904) is started. T0 is a failure occurrence time point, and is, specifically, for example, a time point at which a performance value exceeding the first threshold is measured or a time point at which a failure is detected. TL is a reference to be compared with various types of time points in classification and determination of the countermeasure. The time limit or TL may be a value manually input by the administrator.

The countermeasure type determination program 308 calculates T2 (S1102). T2 is a performance degradation time point, and is, specifically, a time point at which a performance value following the predicted trend reaches the second threshold. T2 is an x coordinate of an intersection of the predicted trend and the second threshold.

The countermeasure type determination program 308 executes the following S1103 to S1114 for each of all the countermeasures indicated in the failure countermeasure information 320. S1103 to S1114 will be described below using one countermeasure as an example. At this time, the one countermeasure will be referred to as a "target countermeasure" for convenience sake in the description of FIG. 11.

The countermeasure type determination program 308 calculates a2 (S1103). a2 is an example of an amount of change after the countermeasure is implemented, and is, specifically, inclination obtained by inputting a1 and y1 to the evaluation function 403 corresponding to the target countermeasure and the specific bottleneck. y1 is a y coordinate corresponding to TP. In other words, a2 indicates inclination of the performance value later than TP.

The countermeasure type determination program 308 calculates T1 (S1104). T1 is a time point at which the performance value is predicted to reach the first threshold on the basis of C1(TP, y1) and a2. T1 is an x coordinate at an intersection of a line 1502 whose inclination is a2 and which passes through C1(TP, y1), and the x axis. Therefore, unless a2 is a negative value, T1 is infinite (refer to a line 1503).

The countermeasure type determination program 308 calculates TD (S1105). TD is a start time point (a time point at which execution of the target countermeasure is expected to be started). TD is calculated on the basis of the start required time 404 corresponding to the target countermeasure and the specific bottleneck and TP. Specifically, for example, in the case where the start required time 404 is a constant, TD is a time point elapsed from TP by the start required time 404. In the case where the start required time 404 is a function, TD is a tentative time point based on TP and the start required time 404. The start required time 404 being a function means, for example, the start required time 404 of the fundamental countermeasure changing according to the emergency countermeasure to be combined. Note that TD may be a countermeasure completion time point (a time point elapsed from TP by the start required time 404 and the execution required time 407) in place of the start time point.

The countermeasure type determination program 308 executes two or more types of determination among the following determination.

S1106: T1<TL? (Is T1 earlier than TL?)
S1107: TD<T2? (Is TD earlier than T2?)

S1108: TD<T2 and a2<a1? (Is TD earlier than T2 and is a2 smaller than a1?)

S1109: TD<TL or is the start required time 404 not a constant?

The countermeasure type determination program 308 classifies the target countermeasure into one of the "fundamental treatment (the emergency countermeasure is unknown)", the "fundamental treatment (the emergency countermeasure is required)", the "emergency treatment" and "ineffective treatment" on the basis of results of these determination (S1110 to S1113). The "fundamental treatment (the emergency countermeasure is unknown)" is fundamental treatment for which it is unknown whether or not the emergency countermeasure is required. The "fundamental treatment (the emergency countermeasure is required)" is fundamental treatment for which the emergency countermeasure is required. The countermeasure type determination program 308 registers the classification result in the countermeasure type information 318 (S1114). Specifically, the countermeasure type determination program 308 adds a record to the countermeasure type information 318 and registers a failure ID corresponding to the target countermeasure, a countermeasure ID, name of a countermeasure type of a classification destination, necessity of the emergency countermeasure and inclination after the countermeasure is implemented (a2 calculated in S1103) in the added record.

The countermeasure type classification (determination in S1106 to S1109 and S1110 to S1113 in accordance with the determination results) conforms to the following policy.

It is desirable that only the fundamental countermeasure is needed.

In case where there is no much time until the start time point of the fundamental countermeasure, it is desirable to buy time by executing the emergency countermeasure.

It is desirable to avoid a start time point of the fundamental countermeasure from being too late.

Case 1 to case 7 will be described below as examples.

Figure 16:
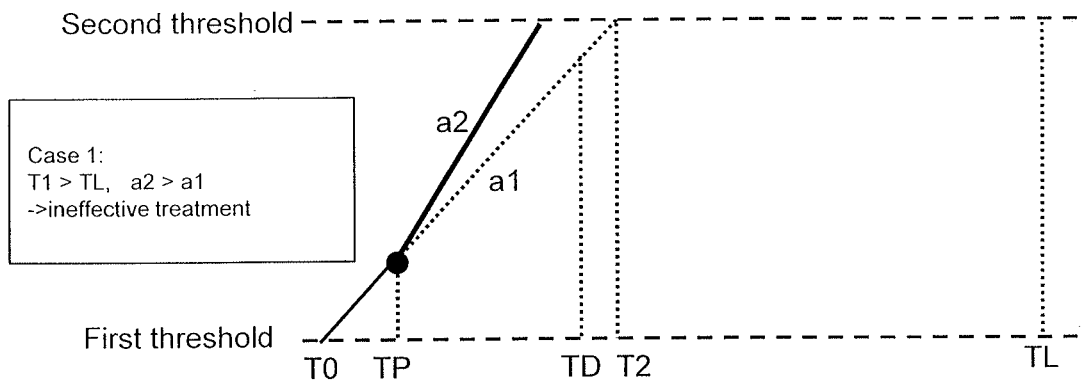
FIG. 16 illustrates an example of case 1.

Case 1 (FIG. 16)

T1>TL and a2>a1. In case 1, the target countermeasure is classified into the "ineffective treatment" (the countermeasure type other than the fundamental treatment, the emergency treatment and the follow-up treatment) (S1113), because the performance value does not become better (the performance value degrades).

Figure 17:
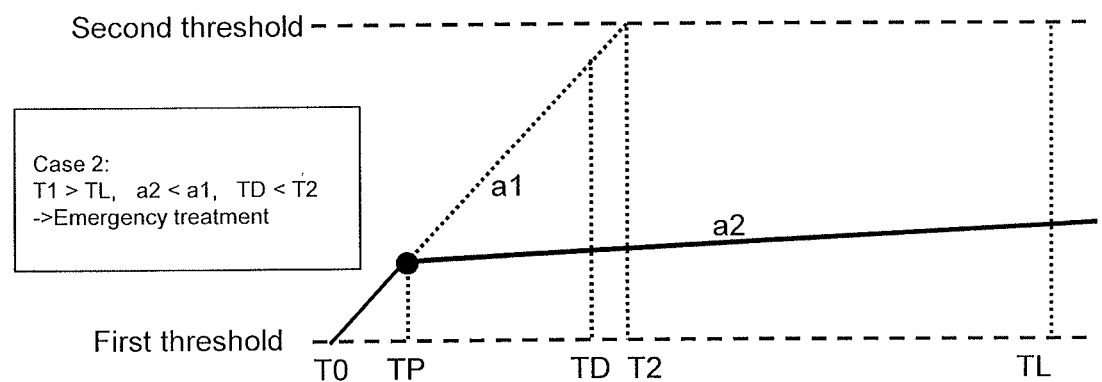
FIG. 17 illustrates an example of case 2.

Case 2 (FIG. 17)

T1>TL, a2<a1 and TD<T2. In case 2, the target countermeasure is classified into the "emergency treatment" (S1112), because, while T1 is infinite, a2 (inclination after the countermeasure is implemented) is smaller than a1 (inclination before the countermeasure is implemented (inclination of the trend 1501)), which means speed of degradation of the performance value can be reduced.

Figure 18:
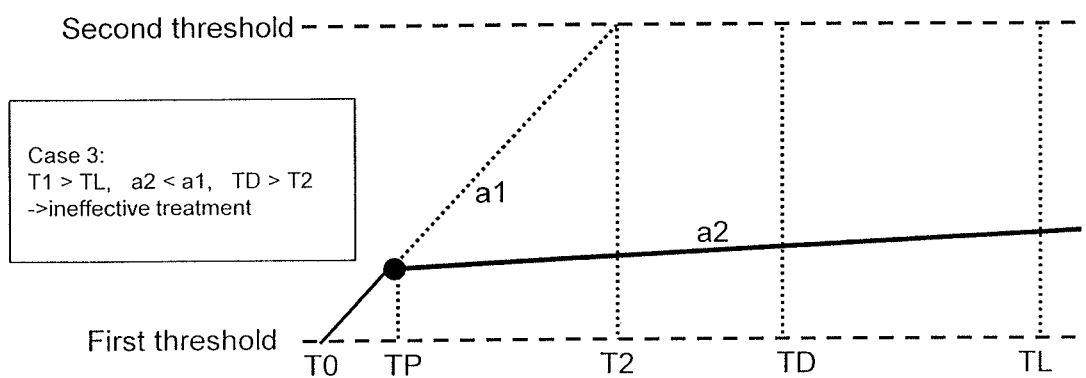
FIG. 18 illustrates an example of case 3.

Case 3 (FIG. 18)

T1>TL, a2<a1 and TD>T2. In case 3, the target countermeasure is classified into the "ineffective treatment" (S1113), because the target countermeasure cannot be started before the performance value reaches the second threshold.

Figure 19:
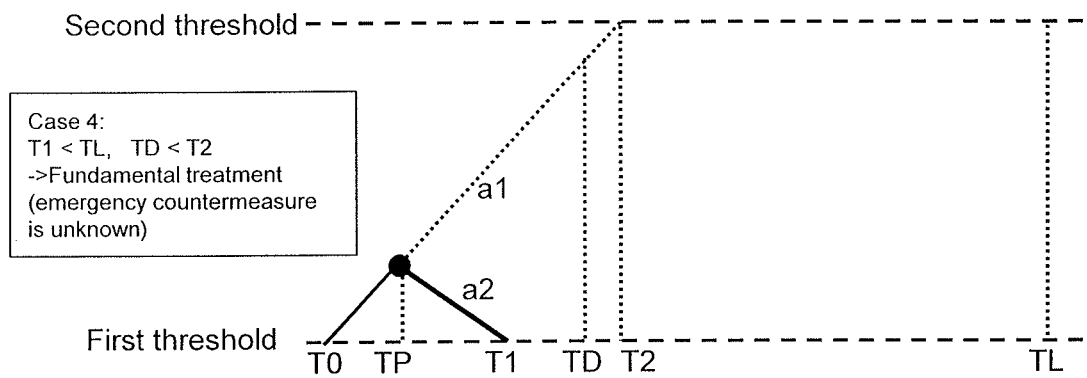
FIG. 19 illustrates an example of case 4.

Case 4 (FIG. 19)

T1<TL and TD<T2. In case 4, the target countermeasure is classified into the "fundamental treatment (the emergency countermeasure is unknown)" (S1110), because the target countermeasure can be started before the performance value reaches the second threshold, and T1 comes earlier than the time limit.

Figure 20:
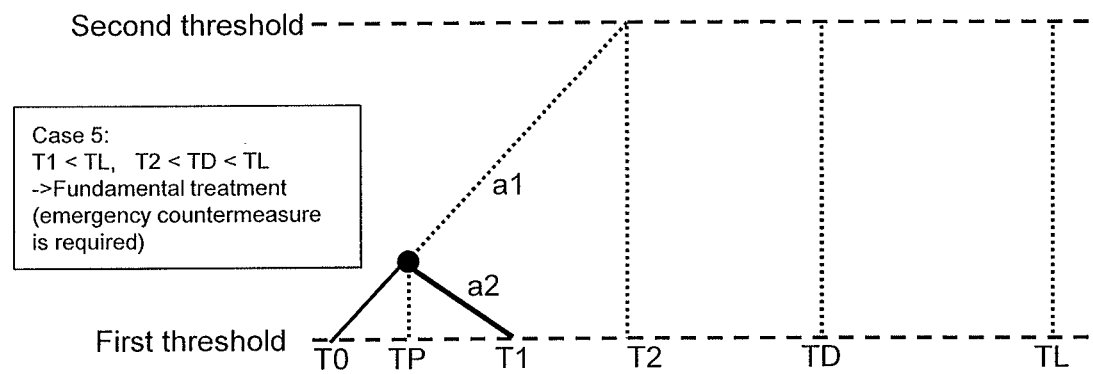
FIG. 20 illustrates an example of case 5.

Case 5 (FIG. 20)

T1<TL, and T2<TD<TL. In case 5, the target countermeasure is classified into the "fundamental treatment (the emergency countermeasure is required)" (S1111), because while T1 comes earlier than the time limit, the target countermeasure cannot be started before the performance value reaches the second threshold.

Figure 21:
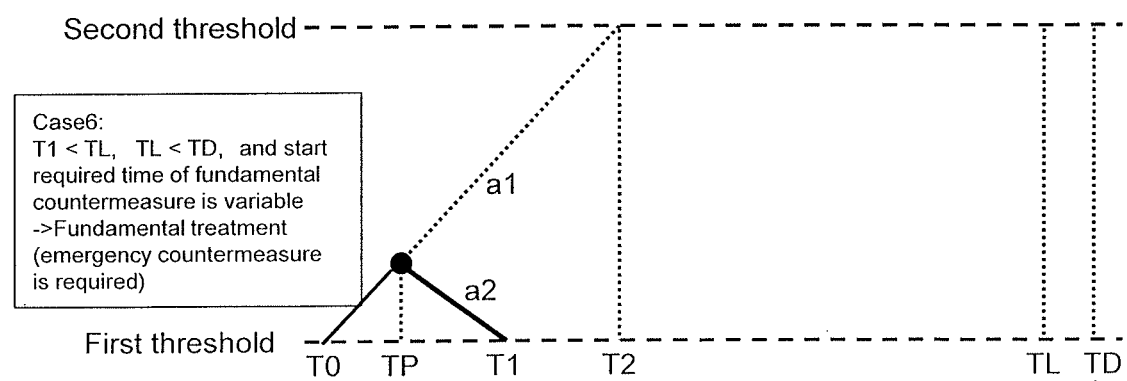
FIG. 21 illustrates an example of case 6.

Case 6 (FIG. 21)

T1<TL, TL<TD, and the start required time 404 of the target countermeasure is not a constant (for example, a function). In case 6, the target countermeasure is classified into the "fundamental treatment (the emergency countermeasure is required)" (S1111). The start required time 404 being not a constant means that the start required time 404 increases or decreases in accordance with the emergency countermeasure to be combined. Therefore, even if the start time point in accordance with the tentative start required time is later than the time limit, there is a possibility that, actually, the start time point may be earlier than the time limit. Therefore, in case 6, the target countermeasure is classified into the "fundamental treatment (the emergency countermeasure is required)".

Figure 22:
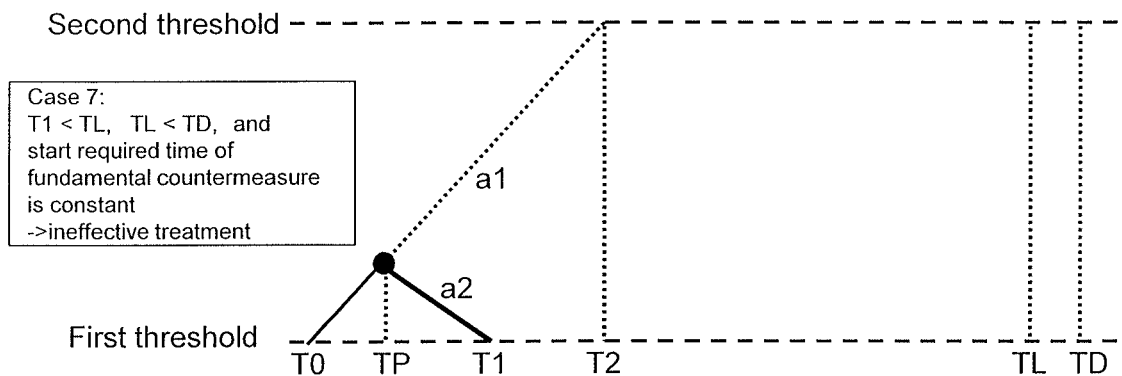
FIG. 22 illustrates an example of case 7.

Case 7 (FIG. 22)

T1<TL, TL<TD and the start required time 404 of the target countermeasure is a constant. In case 7, the target countermeasure is classified into the "ineffective treatment" (S1113), because, unlike with case 6, there is no possibility that, actually, the start time point may be earlier than the time limit.

Figure 12:
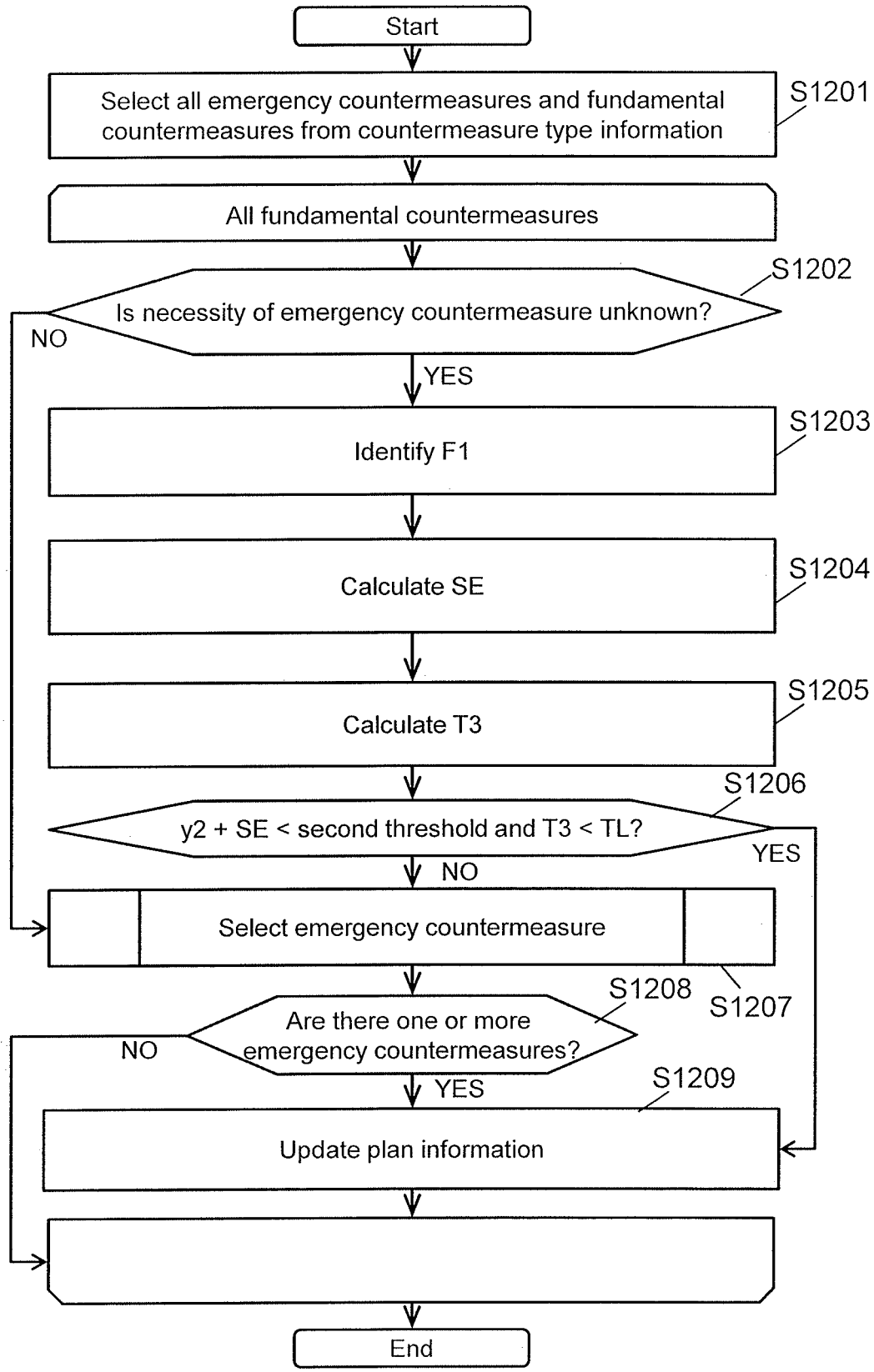
FIG. 12 illustrates flow of optimal combination generation.
Figure 23:
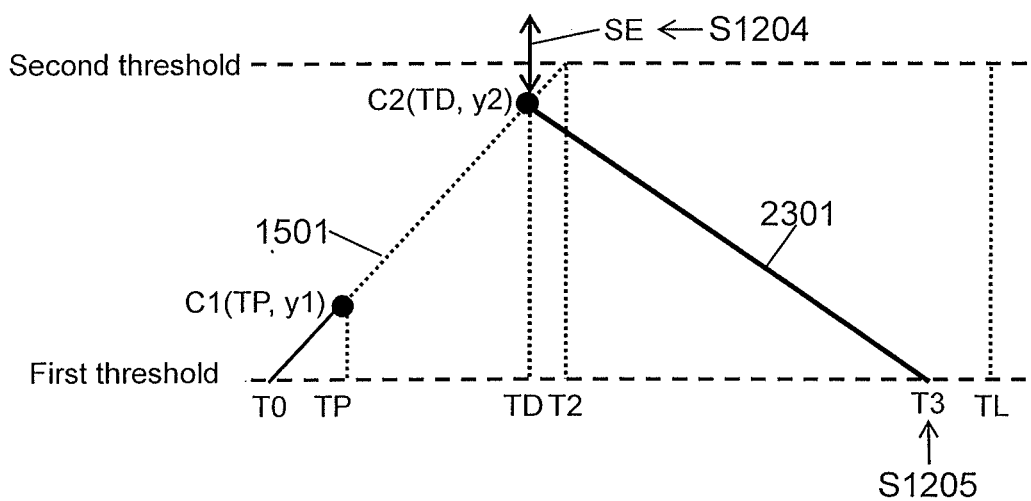
FIG. 23 is an auxiliary view of explanation of optimal combination generation.
Figure 24:
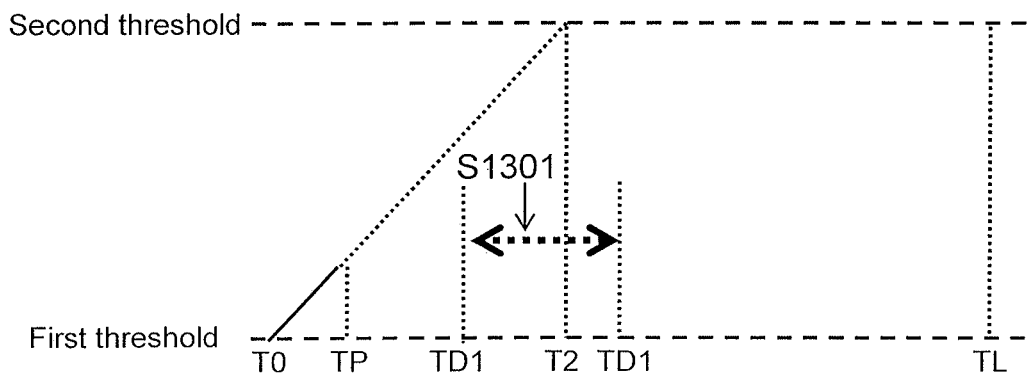
FIG. 24 is a first auxiliary view of explanation of emergency countermeasure selection.
Figure 25:
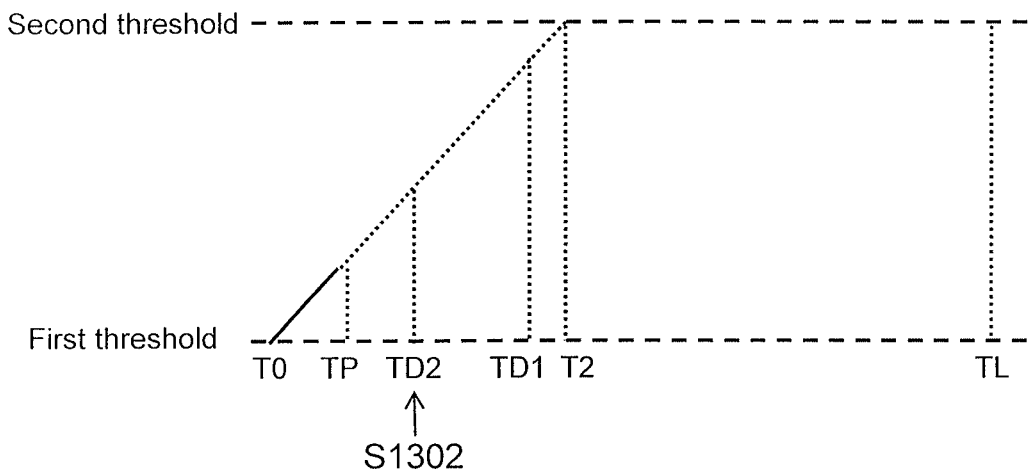
FIG. 25 is a second auxiliary view of explanation of emergency countermeasure selection.
Figure 26:
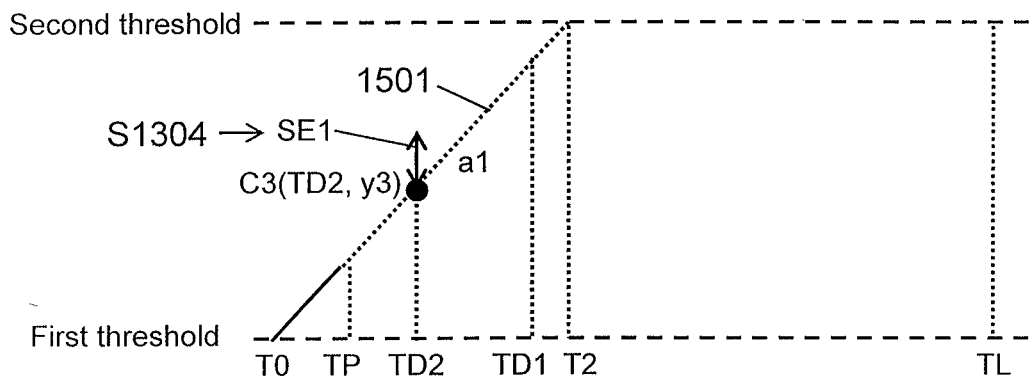
FIG. 26 is a third auxiliary view of explanation of emergency countermeasure selection.
Figure 27:
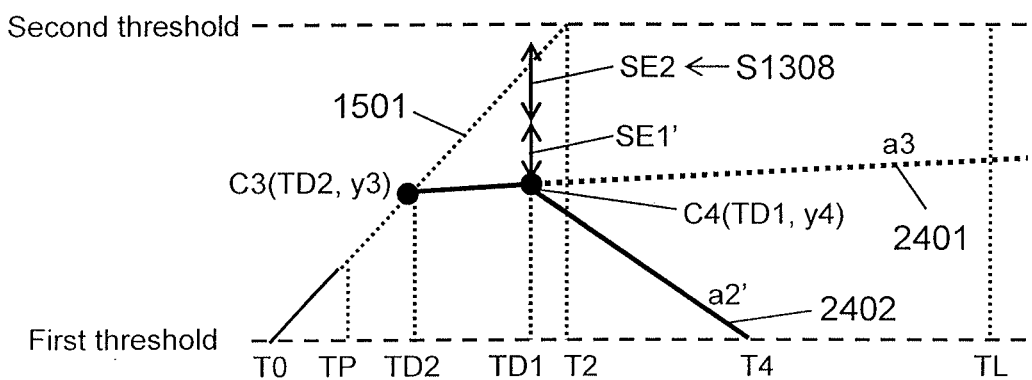
FIG. 27 is a fourth auxiliary view of explanation of emergency countermeasure selection.
Figure 28:
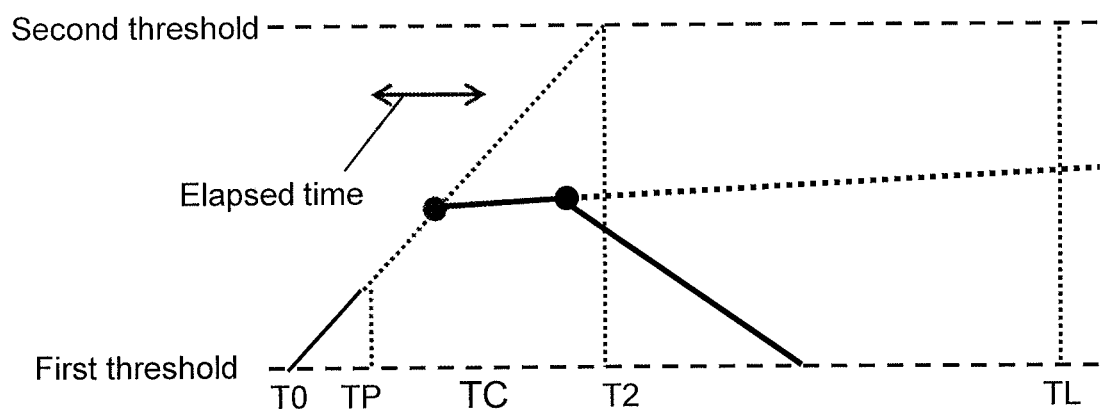
FIG. 28 is an auxiliary view of explanation of effectiveness recalculation.

FIG. 12 illustrates flow of the optimal combination generation (S1003). FIG. 23 will be referred to as appropriate in description of FIG. 12.

The optimal combination generation program 311 selects all the countermeasures (the emergency countermeasures and the fundamental countermeasures) indicated by the countermeasure type information 318 with reference to the countermeasure type information 318 as the result of the countermeasure type determination (S1002) (S1201). The optimal combination generation program 311 executes S1202 to S1209 for each of the fundamental countermeasures among the selected countermeasures. S1202 to S1209 will be described below using one fundamental countermeasure as an example. At that time, the one fundamental countermeasure will be referred to as a "target fundamental countermeasure" for convenience sake in description of FIG. 12 and FIG. 13.

The optimal combination generation program 311 determines whether or not necessity of the emergency countermeasure for the target fundamental countermeasure is unknown (S1202).

In the case where the determination result in S1202 is affirmative (in the case where necessity of the emergency countermeasure 504 corresponding to the target fundamental countermeasure is "unknown") (S1202: Yes), the optimal combination generation program 311 identifies F1 with reference to the side effect information 317 using the side effect ID 405 corresponding to the target fundamental countermeasure and the specific element as a key (S1203). F1 is side effect detail 603 (function) which satisfies the following (1203-1) and (1203-2).

(1203-1) Side effect detail 603 associated with the side effect ID 405 (601) corresponding to the target fundamental countermeasure and the specific element.

(1203-2) Side effect detail 603 associated with side effect outline 602 (for example, "increase in MPB busy rate") with which the performance value type (for example, MPB busy rate) corresponding to the detected performance failure is compatible.

The optimal combination generation program 311 calculates SE (S1204). SE is a maximum width (performance value width) of the side effect for the target fundamental countermeasure. SE is a value obtained by inputting a2 (inclination after countermeasure 505 corresponding to the target fundamental countermeasure) and y2 (a y coordinate corresponding to the TD on the trend 1501) to F1 (SE may be a value depending on at least one of a2 and y2).

The optimal combination generation program 311 calculates T3 (S1205). T3 is a time point at which the performance value is predicted to reach the first threshold on the basis of C2(TD, y2) and a2. T3 is an x coordinate at an intersection of a line 2301 whose inclination is a2 and which passes through C2(TD, y2), and the x axis.

The optimal combination generation program 311 determines whether or not y2+SE<second threshold, and T3<TL (S1206).

In the case where the determination result in S1206 is affirmative (S1206: Yes), it is not necessary to implement the emergency countermeasure before the target fundamental countermeasure is implemented. Therefore, the optimal combination generation program 311 executes S1209 which will be described later without executing emergency countermeasure selection (S1207).

On the other hand, in the case where the determination result in S1206 is negative (S1206: No), that is, in the case where y2+SE is equal to or larger than the second threshold or T3 is equal to or larger than TL, it is necessary to implement the emergency countermeasure before the target fundamental countermeasure is implemented. In a similar manner, in the case where the determination result in S1202 is negative (in the case where the necessity of the emergency countermeasure 504 corresponding to the target fundamental countermeasure is "required") (S1202: No), it is necessary to implement the emergency countermeasure before the target fundamental countermeasure is implemented. Therefore, the optimal combination generation program 311 kicks the emergency countermeasure selection program 323, and the emergency countermeasure selection program 323 executes emergency countermeasure selection (S1207).

As a result of the emergency countermeasure selection, in the case where there is no selected emergency countermeasure (in the case where no ID of the emergency countermeasure is registered in a selection list which will be described later) (S1208: No), the optimal combination generation program 311 does not generate a plan including the target fundamental countermeasure. In other words, the target fundamental countermeasure is eventually treated as an ineffective countermeasure.

On the other hand, as a result of the emergency countermeasure selection, in the case where there are one or more selected emergency countermeasures (S1208: Yes), the optimal combination generation program 311 executes S1209 which will be described later.

In S1209, the optimal combination generation program 311 generates one or more plans including at least the target fundamental countermeasure and registers each of the generated one or more plans in the plan information 319. The plan generation is as follows when description is provided using one plan as an example.

(1209-1) In the case where the emergency countermeasure selection is not performed for the target fundamental countermeasure, the optimal combination generation program 311 generates a plan including the target fundamental countermeasure. In this case, a plan ID 801 and a fundamental countermeasure ID 802 are registered in a record of the plan information 319.

(1209-2) In the case where the emergency countermeasure selection is performed for the target fundamental countermeasure and there are one or more emergency countermeasures, the optimal combination generation program 311 generates a plan including the target fundamental countermeasure and any one of the emergency countermeasures selected for the target fundamental countermeasure. In this case, a plan ID 801, a fundamental countermeasure ID 802 and an emergency countermeasure ID 803 are registered in a record of the plan information 319.

(1209-3) In any of (1209-1) and (1209-2), in the case where a follow-up countermeasure is associated with at least one of F1 and F2 (which will be described later), the optimal combination generation program 311 generates a plan further including the follow-up countermeasure. In this case, in addition to the plan ID 801 and at least the fundamental countermeasure ID 802 among the fundamental countermeasure ID 802 and the emergency countermeasure ID 803, the follow-up countermeasure ID 804 of the above-described associated follow-up countermeasure is registered in the record of the plan information 319. Note that the follow-up countermeasure ID may be registered in the side effect information 317, or the management information 360 may include follow-up countermeasure information (which is not illustrated), and the follow-up countermeasure information may indicate the countermeasure ID 401, the follow-up outline 604, or the like, for each of a plurality of the follow-up countermeasures.

Figure 13:
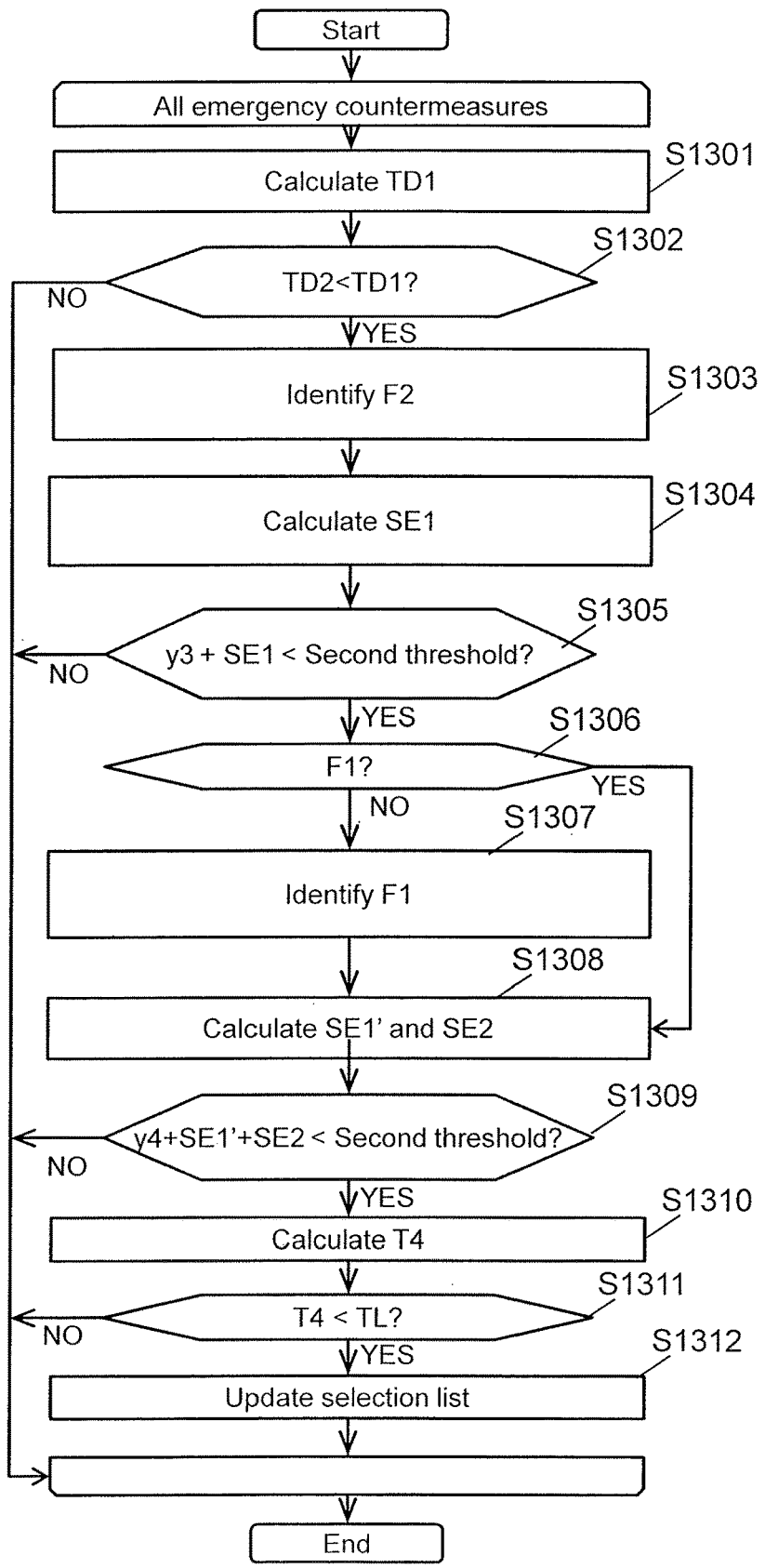
FIG. 13 illustrates flow of emergency countermeasure selection.

FIG. 13 illustrates flow of the emergency countermeasure selection (S1207). FIG. 24 to FIG. 27 will be referred to as appropriate in description of FIG. 13.

The emergency countermeasure selection program 323 executes S1301 to S1312 for each of the emergency countermeasures selected in S1201. S1301 to S1312 will be described below using one emergency countermeasure as an example. At that time, the one emergency countermeasure will be referred to as a "target emergency countermeasure" for convenience sake in the description of FIG. 13.

The emergency countermeasure selection program 323 calculates TD1 (S1301). TD1 is a new start time point of the target fundamental countermeasure, that is, a start time point of the target fundamental countermeasure after the target emergency countermeasure is implemented. TD1 is calculated using start required time 404 (a function or a constant) corresponding to the target fundamental countermeasure and the specific bottleneck and time corresponding to the target emergency countermeasure and the specific bottleneck (the start required time 404, the execution required time 407 or a sum of these). Note that a value used for calculating TD1 is not limited to time. For example, in calculation of TD1, the countermeasure ID 401 of the target emergency countermeasure may be input to the start required time 404 (function) corresponding to the target fundamental countermeasure and the specific bottleneck.

The emergency countermeasure selection program 323 determines whether or not TD2<TD1 (S1302). TD2 is a start time point corresponding to the target emergency countermeasure and the specific bottleneck, that is, a time point elapsed from TP by the start required time 404 corresponding to the target emergency countermeasure and the specific bottleneck. In the case where the determination result in S1302 is negative (S1302: No), the target emergency countermeasure is not selected as the emergency countermeasure to be combined with the target fundamental countermeasure, because the target emergency countermeasure cannot be started before the target fundamental countermeasure is implemented.

In the case where the determination result in S1302 is affirmative (S1302: Yes), the emergency countermeasure selection program 323 identifies F2 (S1303). F2 is side effect detail 603 (function) which satisfies the following (1303-1) and (1303-2).

(1303-1) The side effect detail 603 associated with the side effect ID 405 (601) corresponding to the target emergency countermeasure and the specific element.

(1303-2) The side effect detail 603 associated with side effect outline 602 (for example, "increase in MPB busy rate") with which the performance value type (for example, MPB busy rate) corresponding to the detected performance failure is compatible.

The emergency countermeasure selection program 323 calculates SE1 (S1304). SE1 is a maximum width (performance value width) of a side effect for the target emergency countermeasure, and is a value obtained by inputting a3 and y3 in F2 (SE1 may be a value depending on at least one of a3 and y3). a3 is inclination after countermeasure 505 corresponding to the target emergency countermeasure. y3 is a y coordinate corresponding to TD2 on the trend 1501.

The emergency countermeasure selection program 323 determines whether or not y3+SE1<second threshold (S1305). In the case where the determination result in S1305 is negative (S1305: No), the target emergency countermeasure is not selected as the emergency countermeasure to be combined with the target fundamental countermeasure, because there is a risk that the performance value of the specific bottleneck may reach the second threshold due to the side effect of the target emergency countermeasure.

In the case where the determination result in S1305 is affirmative (S1305: Yes), the emergency countermeasure selection program 323 determines whether or not F1 has been selected (S1306).

In the case where S1202: No, because S1203 is skipped, F1 has not been selected (S1306: No). Therefore, the emergency countermeasure selection program 323 selects F1 (S1307). S1307 may be the same as S1203. On the other hand, in the case where S1202: Yes, because S1203 is executed, F1 has been selected (S1306: Yes). Therefore, S1307 is skipped.

After S1306: Yes, or S1307, the emergency countermeasure selection program 323 calculates SE1' and SE2 (S1308). Specifically, the following is performed.

(S1308-1) The emergency countermeasure selection program 323 calculates a2'. a2' is an example of an amount of change after combination of the target emergency countermeasure and the target fundamental countermeasure is implemented, and is, specifically, inclination obtained by inputting inclination after the emergency countermeasure is implemented (that is, a2 of the target emergency countermeasure (inclination after countermeasure 505 in FIG. 5)) and y4 to the evaluation function 403 of the target fundamental countermeasure. y4 is a y coordinate corresponding to TD1 on a line (line having inclination a3) 2401 which passes through C3(TD2, y3).

(S1308-2) The emergency countermeasure selection program 323 calculates SE1'. SE1' is a maximum width (performance value width) of the side effect for combination of the target emergency countermeasure and the target fundamental countermeasure, and is a value obtained by inputting a2' and y4 to F2 (SE1' may be a value depending on at least one of a2' and y4). As described above, F2 is side effect detail 603 for the target emergency countermeasure (more specifically, as described above, side effect detail 603 (function) which satisfies (1301-1) and (1301-2)).

(S1308-3) The emergency countermeasure selection program 323 calculates SE2. SE2 is a maximum width (performance value width) of the side effect for the target fundamental countermeasure after the target emergency countermeasure is implemented, and is a value obtained by inputting a2' and y4 to F1 (SE2 may be a value depending on at least one of a2' and y4). As described above, F1 is side effect detail 603 for the target fundamental countermeasure (more specifically, as described above, side effect detail 603 (function) which satisfies (1203-1) and (1203-2)).

The emergency countermeasure selection program 323 determines whether or not y4+SE1'+SE2<second threshold (S1309). In the case where the determination result in S1309 is negative (S1309: No), the target emergency countermeasure is not selected as the emergency countermeasure to be combined with the target fundamental countermeasure, because, if both the target emergency countermeasure and the target fundamental countermeasure are implemented, there is a risk that the performance value of the specific bottleneck may reach the second threshold due to the side effect.

In the case where the determination result in S1309 is affirmative (S1309: Yes), the emergency countermeasure selection program 323 calculates T4 (S1310). T4 is a time point at which the performance value is predicted to reach the first threshold on the basis of C4(TD1, y4) and a2'. T4 is an x coordinate at an intersection of a line 2402 whose inclination is a2' and which passes through C4(TD1, y4) and the x axis.

The emergency countermeasure selection program 323 determines whether or not T4<TL (S1311). In the case where the determination result in S1311 is negative (S1311: No), the target emergency countermeasure is not selected as the emergency countermeasure to be combined with the target fundamental countermeasure, because it is not expected that the failure is recovered before the time limit.

In the case where the determination result in S1311 is affirmative (S1311: Yes), the emergency countermeasure selection program 323 registers the target emergency countermeasure (for example, a countermeasure ID of the target emergency countermeasure) in a selection list (which is not illustrated) (S1312). In other words, the emergency countermeasure selection program 323 selects the target emergency countermeasure as the emergency countermeasure to be combined with the target fundamental countermeasure.

As described with reference to FIGS. 10 to 13, in the present embodiment, the management computer 201 roughly classifies each of the plurality of countermeasures into any countermeasure type in the countermeasure type determination (first stage processing) and determines whether the classified fundamental countermeasure is made a fundamental countermeasure to be included in a plan or which emergency countermeasure is to be combined with the fundamental countermeasure in the optimal combination generation (second stage processing). Through such two-stage processing, for example, the following operation effects can be expected.

That is, there can be a countermeasure which causes a side effect in the specific bottleneck among the plurality of countermeasures. There is a possibility that a performance value of the specific bottleneck may degrade due to the side effect upon start of the countermeasure or thereafter. However, in the case where the countermeasure is the fundamental countermeasure, a start time point of the fundamental countermeasure changes according to whether or not the emergency countermeasure is combined with the fundamental countermeasure and, if the emergency countermeasure is combined, which emergency countermeasure is to be combined. In view of such an environment, the management computer 201 roughly (tentatively) classifies the countermeasure into any countermeasure type using a time point such as TP as a reference time point in the countermeasure type determination, and determines whether or not the countermeasure is made a countermeasure to be included in the plan using a predicted start time point of the countermeasure as a reference time point in the subsequent optimal combination. By this means, it is possible to present an appropriate plan for recovering from the failure.

Figure 14:
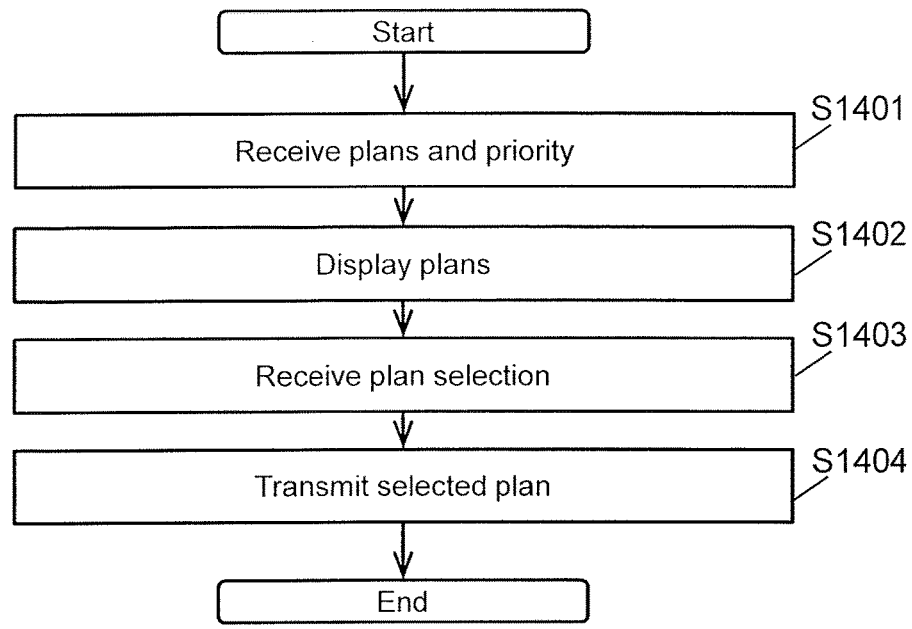
FIG. 14 illustrates flow of screen display and plan selection.

FIG. 14 illustrates flow of screen display (S905) and plan selection (S906).

In screen display (S905), the screen display program 313 receives the priority calculated in S1004 for each of the one or more plans indicated in the plan information 319 from the priority calculation program 312 (S1401). The screen display program 313 displays the plan selection screen 150 (see FIG. 1) in which one or more plans are arranged in descending order of the priority (S1402). In S1402, the screen display program 313 may also display one or more pieces of priority respectively corresponding to the one or more plans at the plan selection screen 150.

In plan selection (S906), the screen display program 313 receives selection of a plan (S1403). The screen display program 313 transmits the selected plan (for example, a plan ID) to the effectiveness recalculation program 322.

The effectiveness recalculation program 322 then recalculates effectiveness of the selected plan. As described above, the recalculation means performing processing similar to processing performed in plan generation (S904) for generating the selected plan on the basis of a plan selection time point TC (see FIG. 28). In other words, processing from FIG. 11 to FIG. 13 is performed for the fundamental countermeasure (and the emergency countermeasure) included in the selected plan assuming that TP=TC.

The meaning of the effectiveness recalculation is, for example, as follows. In other words, because time ticks away, a countermeasure in at least one plan (for example, a plan selected by the administrator) among the generated plans (displayed plans) does not necessarily remain effective at a certain time point (for example, a time point at which a plan is selected by the administrator) TC after the plan generation, because TC may be later than at least one of TD, TD1 and TD2. In the present embodiment, effectiveness recalculation which is processing similar to processing from FIG. 11 to FIG. 13 is performed on the basis of TP=TC only for at least one plan (for example, the plan selected by the administrator) among the generated plans (displayed plans). By this means, it is possible to improve certainty that the selected and executed plan is an effective plan (a plan which does not include an ineffective countermeasure).

Note that TC may be a time point following a predetermined period (for example, a time point following a period of one minute after the plan is displayed) in place of a time point when the plan is selected. The predetermined period may be a period configured by the administrator.

The plan execution (S909) is, for example, as follows. It is assumed that a plan to be executed includes the emergency countermeasure, the follow-up countermeasure and the fundamental countermeasure. The plan execution program 324 executes follow-up in accordance with the follow-up countermeasure at a plan execution start time point or after the plan execution start time point (for example, before the fundamental countermeasure is started). The plan execution program 324 finishes the follow-up at a follow-up releasing trigger 605 associated with the follow-up countermeasure. The program execution program can start the fundamental countermeasure in the plan to be executed in the case where the performance value of the follow-up target satisfies predetermined conditions in the follow-up.

While an embodiment has been described above, this is an example for explaining the present invention and is not intended to limit the scope of the present invention only to the embodiment. The present invention can be implemented in other various forms.

For example, the plan execution program 324 may execute a plan with the highest priority among plans including at least one of the emergency countermeasure and the follow-up countermeasure without receiving selection of a plan from the administrator (further, without display of the plan selection screen 150). Then, in the case where conditions meaning a state where any fundamental countermeasure can be taken are satisfied (for example, in the case where the performance value of the specific bottleneck satisfies predetermined conditions), the screen display program 313 may display the above-described one or more generated plans including a plan in which at least one of the emergency countermeasure and the follow-up countermeasure has been executed, and the plan execution program 324 may receive selection of one of the one or more plans from the administrator. If the selected plan includes at least one of the emergency countermeasure and the follow-up countermeasure, the plan execution program 324 may execute the countermeasure, or, even if the selected plan includes at least one of the emergency countermeasure and the follow-up countermeasure, the plan execution program 324 may execute the fundamental countermeasure without executing the countermeasure. In the case where an urgent failure occurs, because at least one of the emergency countermeasure and the follow-up countermeasure is automatically executed without a plan being selected by the administrator, it is possible to reduce management load.

REFERENCE SIGNS LIST

201: Management computer

The invention claimed is:

1. A management system comprising:
an interface coupled to a computer system including a plurality of elements whose performance values are monitored;
a memory which stores management information including information indicating relationship between a plurality of countermeasure attributes and a plurality of bottlenecks for each of a plurality of countermeasures; and
a processor coupled to the interface and the memory,
wherein each of the plurality of bottlenecks is an element which can be a cause of a failure, and
the processor is configured to:
(A) generate one or more plans on the basis of history of a performance value of a specific bottleneck which is an element identified as a cause of a detected failure, a countermeasure attribute corresponding to the specific bottleneck among the plurality of countermeasure attributes of the plurality of countermeasures, and the management information; and
(B) display the generated one or more plans, each of the displayed one or more plans including one or more countermeasures, and in each of the displayed one or more plans, each of the one or more countermeasures being classified into one of a plurality of countermeasure types.

2. The management system according to claim 1, wherein the plurality of countermeasure types include
fundamental treatment type countermeasures with which the performance value of the specific bottleneck is expected to be returned to equal to or smaller than a first threshold of the performance value until time limit, and
emergency treatment type countermeasures with which an amount of change of the performance value of the specific bottleneck is expected to be reduced, and
a plurality of countermeasure attributes respectively associated with the plurality of countermeasures include
(x1) change of a performance value expected for the respective countermeasure, and
(x2) at least one of start required time which is time required until the respective countermeasure is started and execution required time which is time from when the respective countermeasure is started until when the respective countermeasure is finished.

3. The management system according to claim 2, wherein an emergency treatment type countermeasure satisfies that
an amount of change after the emergency treatment type countermeasure is implemented which is an amount of change of a performance value in accordance with (x1) corresponding to the emergency treatment type countermeasure is smaller than an amount of change before the emergency treatment type countermeasure is implemented which is an amount of change of an emergency treatment performance value in accordance with history of the emergency treatment performance value of the specific bottleneck, and
a time point in accordance with (x2) corresponding to the emergency treatment type countermeasure is earlier than a time point at which the emergency treatment performance value degrades which is a time point at which the emergency treatment performance value of the specific bottleneck is predicted to reach a second threshold on the basis of the amount of change before the emergency treatment type countermeasure is implemented, and
the second threshold is a threshold meaning that the emergency treatment performance value is worse than the first threshold.

4. The management system according to claim 2, wherein the plurality of countermeasure types further include follow-up treatment,
the management information indicates a secondary effect of a performance value for at least one countermeasure and a follow-up countermeasure which is a countermeasure classified into the follow-up treatment for at least one secondary effect, and
a plan including a countermeasure associated with a secondary effect associated with the follow-up countermeasure among the displayed one or more plans further includes the follow-up countermeasure.

5. The management system according to claim 2, wherein, the processor is configured to,
after (A),automatically execute an emergency treatment type countermeasure in any plan without executing (B) or without receiving plan selection, and
in the case where conditions meaning a state where any fundamental treatment type countermeasure can be taken are satisfied, execute (B).

6. The management system according to claim 2, wherein each countermeasure included in the displayed one or more plans is an effective countermeasure which can be included in any plan on the basis of a result of comparison between the time limit and a time point in accordance with (x2) of the displayed countermeasure.

7. The management system according to claim 2, wherein, for at least one countermeasure among the plurality of countermeasures, the management information indicates a secondary effect of the respective performance value,
in a plan including a countermeasure associated with the secondary effect, a predicted performance value predicted in accordance with secondary effects of all countermeasures included in the plan, which is a performance value at a time point in accordance with (x2) of a countermeasure classified into the fundamental treatment is smaller than a second threshold.

8. The management system according to claim 7, wherein the management information further indicates a follow-up countermeasure for at least one secondary effect, and
among the displayed one or more plans, a plan including a countermeasure associated with the secondary effect associated with the follow-up countermeasure further includes the follow-up countermeasure.

9. The management system according to claim 2, wherein the management information indicates a secondary effect of a performance value for at least one countermeasure among the plurality of countermeasures,
the processor is configured to: in (A),
(a1) classify each of the plurality of countermeasures as one of the fundamental treatment type, the emergency treatment type or an ineffective treatment type which does not correspond to either the fundamental treatment and the emergency treatment types of countermeasures;
(a2) for each countermeasure which is classified as a fundamental treatment type of countermeasure in (a1);
(a21) identify a secondary effect associated with the countermeasure from the management information;
(a22) determine whether or not to combine an emergency treatment type countermeasure with the countermeasure on the basis of the identified secondary effect;
(a23) in the case where a determination result in (a22) is negative, generate a plan including the countermeasure; and
(a24) in the case where a determination result in (a22) is positive, generate one or more plans each including the countermeasure and the emergency treatment type countermeasure, and
each of the one or more plans generated in (A) is a plan including at least a countermeasure classified as the fundamental treatment type.

10. The management system according to claim 9, wherein, for each respective countermeasure of the fundamental treatment type countermeasures,
determination in (a22) is determination as to whether or not a performance value upon start is smaller than a second threshold, and a time point after the respective fundamental treatment type countermeasure is implemented is earlier than the time limit, the performance value upon start is a performance value predicted in accordance with a secondary effect associated with the respective fundamental treatment type countermeasure, and is a performance value at a time point in accordance with (x2) of the respective fundamental treatment type countermeasure, the second threshold is a threshold meaning that the performance value is worse than the first threshold, and the time point after the respective fundamental treatment type countermeasure is implemented is a time point at which the performance value is predicted to be returned to equal to or smaller than the first threshold on the basis of an amount of change of the performance value in accordance with (x1) corresponding to the respective fundamental treatment type countermeasure and a time point in accordance with (x2) of the respective fundamental treatment type countermeasure.

11. The management system according to claim 10, wherein the processor is configured to, in (a24), for each respective countermeasure of the emergency treatment type countermeasures, predict, on the basis of a secondary effect associated with the respective emergency treatment type countermeasure, a secondary effect associated with a fundamental treatment type countermeasure and an amount of change before the respective emergency treatment type countermeasure is implemented which is an amount of change of the performance value in accordance with history of the performance value of the specific bottleneck, a performance value at a time point in accordance with (x2) of the fundamental treatment type countermeasure, and in the case where the predicted performance value is smaller than the second threshold, select the respective emergency treatment type countermeasure as an emergency treatment type countermeasure to be included in a plan along with the fundamental treatment type countermeasure.

12. The management system according to claim 1, wherein, in each of the displayed one or more plans, each of the one or more countermeasures is classified into one of the plurality of countermeasure types on the basis of a result of comparison between an amount of change after the respective countermeasure is implemented which is an amount of change of a respective performance value in accordance with change of a performance value expected for the respective countermeasure corresponding to the respective countermeasure and an amount of change before the respective countermeasure is implemented which is an amount of change of a respective performance value in accordance with history of the respective performance value of the specific bottleneck, and a result of comparison between a time point in accordance with at least one of start required time which is time required until the respective countermeasure is started and execution required time which is time from when the respective countermeasure is started until when the respective countermeasure is finished corresponding to the respective countermeasure and a time point at which the respective performance value degrades which is a time point at which the respective performance value of the specific bottleneck is predicted to reach a second threshold on the basis of the amount of change before the respective countermeasure is implemented, and the second threshold is a threshold meaning that the respective performance value is worse than the first threshold.

13. The management system according to claim 1, wherein the generated one or more plans is a plan generated on the basis of a time point defined as a plan generation time point, and the processor is configured to:

execute effectiveness determination of determining, on the basis of a time point at which any plan among the displayed one or more plans is selected or a time point designated in advance, whether or not each of the displayed one or more plans or the selected plan remains effective; and in the case where a result of the effectiveness determination is affirmative, execute the plan selected after the effectiveness determination or the selected plan before the effectiveness determination.

14. A management method of a computer system including a plurality of elements whose performance values are monitored, the method comprising:

(A) generating one or more plans on the basis of history of a performance value of a specific bottleneck which is an element identified as a cause of a detected failure, management information including information indicating relationship between a plurality of countermeasure attributes and a plurality of bottlenecks for each of a plurality of countermeasures, and a countermeasure attribute corresponding to the specific bottleneck among the plurality of countermeasure attributes of the plurality of countermeasures, and (B) displaying the generated one or more plans, each of the displayed one or more plans including one or more countermeasures, and in each of the displayed one or more plans, each of the one or more countermeasures being classified into one of a plurality of countermeasure types.

15. A non-transitory recording medium readable by a processor having a computer program for execution by a computer coupled to a computer system including a plurality of elements whose performance values are monitored, the computer program causing the computer to execute:

(A) generation of one or more plans on the basis of history of a performance value of a specific bottleneck which is an element identified as a cause of a detected failure, management information including information indicating relationship between a plurality of countermeasure attributes and a plurality of bottlenecks for each of a plurality of countermeasures, and a countermeasure attribute corresponding to the specific bottleneck among the plurality of countermeasure attributes of the plurality of countermeasures, and (B) display of the generated one or more plans, each of the displayed one or more plans including one or more countermeasures, and in each of the displayed one or more plans, each of the one or more countermeasures being classified into one of a plurality of countermeasure types.

* * * * *